(12) United States Patent
Kalt

(10) Patent No.: US 8,628,150 B2
(45) Date of Patent: Jan. 14, 2014

(54) TRADING SYSTEM AND METHODS

(75) Inventor: David S. Kalt, Glencoe, IL (US)

(73) Assignee: optionsXpress Holdings, Inc., Chicago, IL (US)

( * ) Notice: Subject to any disclaimer, the term of this patent is extended or adjusted under 35 U.S.C. 154(b) by 1024 days.

(21) Appl. No.: 12/074,265

(22) Filed: Feb. 28, 2008

(65) Prior Publication Data

US 2008/0228633 A1    Sep. 18, 2008

Related U.S. Application Data

(60) Provisional application No. 60/904,028, filed on Feb. 28, 2007.

(51) Int. Cl.
 *G06Q 40/00* (2012.01)
(52) U.S. Cl.
 USPC .......................................................... 305/40
(58) Field of Classification Search
 USPC .................................................... 705/35–45
 See application file for complete search history.

(56) References Cited

U.S. PATENT DOCUMENTS

| | | | |
|---|---|---|---|
| 5,041,967 A | 8/1991 | Ephrath et al. | |
| 5,644,737 A | 7/1997 | Tuniman et al. | |
| 5,757,371 A | 5/1998 | Oran et al. | |
| 5,867,162 A | 2/1999 | O'Leary et al. | |
| 5,960,411 A | 9/1999 | Hartman et al. | |
| 6,121,968 A | 9/2000 | Arcuri et al. | |
| 6,278,450 B1 | 8/2001 | Arcuri et al. | |
| 6,408,282 B1 * | 6/2002 | Buist | 705/36 R |
| 6,938,207 B1 | 8/2005 | Haynes | |
| 2003/0222910 A1 * | 12/2003 | Guerrero | 345/760 |
| 2005/0222937 A1 * | 10/2005 | Coad et al. | 705/37 |
| 2007/0124217 A1 * | 5/2007 | Terry et al. | 705/28 |
| 2007/0130207 A1 * | 6/2007 | Pate et al. | 707/104.1 |
| 2008/0079695 A1 * | 4/2008 | Martin et al. | 345/163 |

* cited by examiner

*Primary Examiner* — Robert R Niquette
*Assistant Examiner* — Chia Yi Liu
(74) *Attorney, Agent, or Firm* — Valauskas Corder LLC

(57) ABSTRACT

The present invention is directed to a system and method that facilitates the more fully informed and efficient trading of items of value, including securities. According to the present invention, certain embodiments permit a customer to determine the merits of and to execute a trade from a single screen. One embodiment of the present invention provides a single option chain trading screen enabling a customer to view a matrix of all available options for a given security, including the various strike prices, expiration dates, and whether they are calls or puts. Another embodiment provides a customer with a single option chain trading screen allowing a customer to "hover" at or near various icons to obtain supplemental information without leaving the trading screen, and use a triple-action selection component to ultimately execute a trade.

14 Claims, 23 Drawing Sheets optionsXpress
Online Options, Stock & Futures Brokers

☾ You're a night owl? So are Futures.    ⌂ >>Open Another Account   🔒LOG OFF  ❓LIVE HELP

| Welcome | Account | Trade | Quotes | Indices | Toolbox | Chains | Educate | Help |

Quote Detail | Markets | Most Actives | ETFs | Indices | Charts | Chains | Watch Lists | Streaming Option Pricer | Cov Calls | Straddles | Put Spreads | Call Spreads | Collars | Calendar Puts | Calendar Calls | Imp Vol

Option Chains for QQQQ — 250    270 — ⓘ About Chains  ☐ Customize [Patent Pending]
Quotes as of 2/19/2008 4:27:54 PM ET Symbol: QQQQ    Range: Near-the-Money ▼    Type: Calls And Puts ▼    Expiration: Mar 08 ▼    [View Chain]

☐ Find Symbol / Futures    ☐ Include Adjusted / Non-standard

- Calls And Puts
- Calls
- Puts
- Call Matrix
- Put Matrix
- Ask Pricer
- Straddles
- Strangles
- Covered Calls
- Call Spreads
- Put Spreads
- Collars
- Calendar Call Spreads
- Calendar Put Spreads
- Diagonal Call Spreads
- Diagonal Put Spreads
- Implied Volatility
- Butterfly Call Spread
- Butterfly Put Spread
- Iron Condor Spread
- Combos (short put/long call)
- Futures Chain
- Futures Options

POWERSHARES QQQ TRUST SERIES 1

Symbol: QQQQ  Last: 43.74  Change: -0.08▼  Bid: 43.71  Ask: 43.7

QQQQ Expiration Months: Mar 08 | Q1 Mar 08 | Apr 08 | (31 days to expiration)

Volume: 107,929,459  Chart

Time & Sales | Chart | Volatility View | News

Q3 Sep 08 | Q4 Dec 08 | Jan 09 | Q4 Dec 09 | Jan 10    NASDAQ-100

☐ Disable Roll Overs

| | Calls | | | | | | Puts | | | | | |
|---|---|---|---|---|---|---|---|---|---|---|---|---|
| Symbol | Last | Chg | Bid | Ask | Vol | Opint | Last | Chg | Bid | Ask | Vol | Opint | Action |

Mar 08 Calls / Mar 08 Puts

| Symbol | Last | Chg | Bid | Ask | Vol | Opint | Last | Chg | Bid | Ask | Vol | Opint | Action |
|---|---|---|---|---|---|---|---|---|---|---|---|---|---|
| QAVCH | 9.37 | -1.39 | 9.77 | 9.88 | 11 | 3,268 | .04 | 0.01 | 0.03 | 0.04 | 39 | 9,151 | Trade ☐ |
| QQQCI | 8.63 | -0.04 | 8.80 | 8.89 | 10 | 1,828 | .04 | -0.01 | 0.03 | 0.05 | 65 | 55,455 | Trade ☐ |
| QQQCJ | 8.32 | -0.16 | 7.81 | 7.91 | 15 | 3,665 | .06 | -0.02 | 0.05 | 0.07 | 40 | 5,951 | Trade ☐ |
| QQQCK | 6.80 | -0.35 | 6.85 | 6.94 | 104 | 3,235 | .11 | 0.01 | 0.10 | 0.11 | 212 | 20,185 | Trade ☐ |
| QQQCL | 5.70 | -0.34 | 5.91 | 6.00 | 121 | 3,680 | .16 | 0 | 0.15 | 0.16 | 2,841 | 14,989 | Trade ☐ |
| QQQCM | 4.85 | -0.02 | 5.00 | 5.08 | 96 | 5,746 | .23 | -0.02 | 0.22 | 0.23 | 32,308 | 48,110 | Trade ☐ |
| QQQCN | 4.12 | -0.11 | 4.11 | 4.20 | 655 | 14,423 | 0.35 | -0.01 | 0.34 | 0.35 | 2,961 | 136,502 | Trade ☐ |
| QQQCO | 3.27 | -0.15 | 3.28 | 3.34 | 1,366 | 9,224 | 0.51 | -0.04 | 0.0349 | 0.51 | 39,805 | 54,317 | Trade ☐ |
| QQQCP | 2.57 | -0.11 | 2.52 | 2.57 | 15,166 | 19,128 | 0.75 | -0.01 | 0.0373 | 0.76 | 14,381 | 93,149 | Trade ☐ |

| | | | 40.00 | QQQON | | | | | |
| | | | 41.00 | QQQOO | | | | | |
| | | | 42.00 | QQQOP | | | | | |

QQQQ [Go]    Last 43.74  Change -.08  Bid 43.71 (1)  Ask 43.73 (88)  Vol 107,929,459

NASDAQ 2306.2▼-15.6  S&P500 1348.78▼-1.21

DJIA 12337.22▼-70.99  NASDAQ

Time 16:27:34   Streaming Quotes  ☐ Refresh   chain | trade | chart | more

| Symbol | Last | Chg | Bid | Ask | Vol | Opint | Action |
|---|---|---|---|---|---|---|---|
| Jan 09 Calls | | | | | | | |
| .OZCAH | Quote Book \| Greeks | | | | | | |
| .OZCAI | Implied Volatility | | Delta | | Gamma | | |
| .OZCAJ | 28.32 | | 0.71 | | 0.03 | | |
| .OZCAK | Rho | | Theta | | Vega | | |
| .OZCAL | 0.22 | | -0.01 | | 0.14 | | |
| .OZCAM | | | | | | | |
| .OZCAN | 7.00 | -0.05 | 6.99 | 7.24 | 09 | 4,325 | Trade ☐ |
| .OZCAO | 6.75 | 0.29 | 6.31 | 6.61 | 20 | 4,461 | Trade ☐ |
| .OZCAP | 5.74 | -0.23 | 5.73 | 5.99 | 74 | 22,059 | Trade ☐ |

(Table continues with Puts side: Strike, Symbol, Last, Chg, Bid, Ask, Vol, Opint, Action for Jan 09 Puts)

| Strike | Symbol | Last | Chg | Bid | Ask | Vol | Opint | Action |
|---|---|---|---|---|---|---|---|---|
| QQQQ @ 43.74 | | | | | | | | |
| 34.00 | .OZCMH | 1.46 | 0 | 1.31 | 1.40 | 00 | 6,134 | Trade ☐ |
| 35.00 | .OZCMI | 1.50 | -0.05 | 1.50 | 1.61 | 15 | 5,785 | Trade ☐ |
| 36.00 | .OZCMJ | 1.80 | 0.02 | 1.72 | 1.84 | 52 | 7,199 | Trade ☐ |
| 37.00 | .OZCMK | 2.05 | 0 | 1.95 | 2.07 | 00 | 3,107 | Trade ☐ |
| 38.00 | .OZCML | 2.45 | 0 | 2.21 | 2.35 | 00 | 16,713 | Trade ☐ |
| 39.00 | .OZCMM | 2.35 | 0 | 2.50 | 2.64 | 00 | 5,190 | Trade ☐ |
| 40.00 | .OZCMN | 2.72 | -0.26 | 2.81 | 2.98 | 02 | 56,425 | Trade ☐ |
| 41.00 | .OZCMO | 3.08 | -0.15 | 3.16 | 3.34 | 02 | 6,426 | Trade ☐ |
| 42.00 | .OZCMP | 3.50 | -0.09 | 3.53 | 3.70 | 20 | 40,389 | Trade ☐ |

FIG. 5

| optionsXpress | | | | | | | | 🔒 >>Open Another Account | 🔒LOG OFF ?LIVE HELP | |
|---|---|---|---|---|---|---|---|---|---|---|
| Online Options, Stock & Futures Brokers | | | | | | | $100 bucks in your account. See how | 🔍 How do I fund my account? | Search | |
| Welcome | Account | Markets | Most Actives | ETFs | Trade | Quotes | Toolbox | Educate | Help | |
| Quote Detail | Markets | Most Actives | ETFs | Indices | Charts | Chains | Watch Lists | Streaming | | |

Option Chains for QQQQ
Quotes as of 2/19/2008 4:50:36 PM ET

| | | | Option Pricer | Cov Calls | Straddles | Put Spreads | Call Spreads | Collars | Calendar Puts | Calendar Calls | Imp Vol |
| Symbol | | Range | | Type | | | | | | | 🔍 About Chains ☐ Customize |
| QQQQ | | Near-the-Money ▼ | | Call Matrix ▼ | | | | | | | [Patent Pending] |
| 🔍 Find Symbol / Futures | | | | | | | | Expiration | All + Leaps ▼ | | View Chain |

POWERSHARES QQQ TRUST SERIES 1

| Symbol | Last | Change | Bid | Ask | High | Low | Volume | | | Time & Sales | Chart | Volatility View | News |
|---|---|---|---|---|---|---|---|---|---|---|
| QQQQ | 43.74 | -0.08▼ | 43.71 | 43.72 | 44.50 | 43.27 | 110,172,919 | | Chart 📈 | NASDAQ-100 |

Calls Matrix for QQQQ    ☐ Disable Roll Overs

| Strike | Mar 08 | Apr 08 | May 08 | Jun 08 | Sep 08 | Jan 09 | Jan 10 |
|---|---|---|---|---|---|---|---|
| 34.00 | ☐ 9.77 / 9.88 | ☐ 9.85 / 10.00 | ☐ 10.01 / 10.17 | ☐ 10.29 / 10.44 | ☐ 10.79 / 10.99 | ☐ 11.24 / 11.64 | ☐ |
| 35.00 | ☐ 8.80 / 8.89 | ☐ 8.83 / 9.04 | ☐ 9.15 / 9.26 | ☐ 9.42 / 9.55 | ☐ 9.96 / 10.16 | ☐ 10.54 / 10.85 | ☐ |
| QQQQ MAR 41 Call (.QQQCO) | | | ☐ 8.27 / 8.35 | ☐ 8.52 / 8.69 | ☐ 9.19 / 9.34 | ☐ 9.79 / 10.08 | ☐ |
| 3.27 | -0.15 | 3.74 | 1,366 | ☐ 7.37 / 7.47 | ☐ 7.64 / 7.84 | ☐ 8.37 / 8.55 | ☐ 9.00 / 9.32 | ☐ |
| Last Trade | Change | Today's Open | Volume | ☐ 6.50 / 6.63 | ☐ 6.84 / 7.01 | ☐ 7.62 / 7.79 | ☐ 8.33 / 8.62 | ☐ 10.37 / 10.81 |
| Bid | 3.28 | Bid Size | 121 | ☐ 5.67 / 5.81 | ☐ 6.11 / 6.22 | ☐ 6.88 / 7.05 | ☐ 7.65 / 7.91 | ☐ 9.76 / 10.18 |
| Ask | 3.34 | Ask Size | 13 | ☐ 4.89 / 5.03 | ☐ 5.36 / 5.47 | ☐ 6.18 / 6.33 | ☐ 6.99 / 7.24 | ☐ 9.22 / 9.60 |
| Exp Date 3/21/2008 | | Open Int | 9,224 | ☐ 4.17 / 4.28 | ☐ 4.60 / 4.75 | ☐ 5.51 / 5.65 | ☐ 6.31 / 6.61 | ☐ |
| 41.00 | ☐ 3.28 / 3.34 | ☐ 3.78 / 3.84 | ☐ 3.48 / 3.59 | ☐ 3.94 / 4.05 | ☐ 4.87 / 5.01 | ☐ 5.73 / 5.99 | ☐ 8.04 / 8.46 |
| 42.00 | ☐ 2.52 / 2.57 | ☐ 3.06 / 3.12 | ☐ 2.83 / 2.95 | ☐ 3.29 / 3.41 | ☐ 4.28 / 4.41 | ☐ 5.26 / 5.41 | ☐ |
| 43.00 | ☐ 1.84 / 1.89 | ☐ 2.41 / 2.46 | ☐ 2.29 / 2.36 | ☐ 2.77 / 2.85 | ☐ 3.74 / 3.84 | ☐ 4.60 / 4.87 | ☐ 7.00 / 7.39 |
| 44.00 | ☐ 1.26 / 1.27 | ☐ 1.82 / 1.87 | | | | | |

| QQQQ | Go | QQQQ NASDAQ | Last 43.74 | Change -.08 | Bid 43.71 (1) | Ask 43.73 (88) | Vol 107,929,459 | Time 16:27:34 | chain | trade | chart | more |
|---|---|---|---|---|---|---|---|---|---|

DJIA 12337.22 ▼ -10.99  NASDAQ 2306.2 ▼ -15.6  S&P500 1348.78 ▼ -1.21    Streaming Quotes  ☐ Refresh

FIG. 6A

| | Symbol | Bid | Ask | High 44.50 | Low 43.27 | Volume 110,165,606 | | |
|---|---|---|---|---|---|---|---|---|

QQQQ Expiration Months: Mar 08 | Q1 Mar 08 | Apr 08 | May 08 | Jun 08 | Q2 Jun 08 | Sep 08 | Q3 Sep 08 | Q4 Dec 08 | Jan 09 | Q4 Dec 09 | Jan 10

Chains

| | Symbol | Bid | Ask | Break Even | Max Profit | Max Loss | Return % of Risk | Action |
|---|---|---|---|---|---|---|---|---|
| Call Spread Chain (Jan 09) | | | | | | | (332 days to expiration) | |
| ⊞ Jan 34 / 35 C | QQQQ | 0.39 | 1.10 | 35.10 | ($10.00) | $110.00 | -9.09% | Trade \| Watch \| Calc |
| ⊞ Jan 35 / 36 C | QQQQ | 0.46 | 1.06 | 36.06 | ($6.00) | $106.00 | -5.66% | Trade \| Watch \| Calc |
| ⊞ Jan 36 / 37 C | QQQQ | 0.47 | 1.08 | 37.08 | ($8.00) | $108.00 | -7.41% | Trade \| Watch \| Calc |
| ⊞ Jan 37 / 38 C | QQQQ | 0.38 | 0.99 | 37.99 | $1.00 | $99.00 | 1.01% | Trade \| Watch \| Calc |
| ⊞ Jan 38 / 39 C | QQQQ | 0.42 | 9.97 | 38.97 | $3.00 | $97.00 | 3.09% | Trade \| Watch \| Calc |
| ⊞ Jan 39 / 40 C | QQQQ | 0.41 | 0.92 | 39.92 | $8.00 | $92.00 | 8.70% | Trade \| Watch \| Calc |
| ⊞ Jan 40 / 41 C | QQQQ | 0.38 | 0.93 | 40.93 | $7.00 | $93.00 | 7.53% | Trade \| Watch \| Calc |
| ⊞ Jan 41 / 42 C | QQQQ | 0.32 | 0.88 | 41.88 | $12.00 | $88.00 | 13.64% | Trade \| Watch \| Calc |

552

56 options X press
Online Options, Stock & Futures Brokers

Don't Get Burned. Ask the Dragon℠  >>Open Another Account  LOG OFF  LIVE HELP  Search Do options trade after hours?

| Welcome | Account | Markets | Most Actives | Trade | ETFs | Quotes | Indices | Charts | Toolbox | Chains | Watch Lists | Streaming | Educate | Help |

Quote Detail | Markets | Most Actives | ETFs | Indices | Charts | Chains | Watch Lists | Streaming

Option Chains for QQQQ
Quotes as of 2/19/2008 4:44:39 PM ET

Option Pricer | Cov Calls | Straddles | Put Spreads | Call Spreads | Collars | Calendar Puts | Calendar Calls | Imp Vol About Chains  ☐ Customize  [Patent Pending]

Symbol: QQQQ
Range: Near-the-Money
Type: Call Spreads
Expiration: Jan 09    View Chain Q Find Symbol / Futures

POWERSHARES QQQ TRUST SERIES 1

| Symbol | Last | Change | Bid | Ask | High | Low | Volume |
|--------|------|--------|-----|-----|------|-----|--------|
| QQQQ | 43.74 | -0.08▼ | 43.71 | 43.74 | 44.50 | 43.27 | 110,165,606 |

Time & Sales | Chart | Volatility View | News   Chart 📈   NASDAQ-100

QQQQ Expiration Months: Mar 08 | Q1 Mar 08 | Apr 08 | May 08 | Jun 08 | Q2 Jun 08 | Sep 08 | Q3 Sep 08 | Q4 Dec 08 | Jan 09 | Q4 Dec 09 | Jan 10

Chains

Set Interval [1 ▼]

Call Spread Chain (Jan 09) — (332 days to expiration)

| | Bid/Offer | QTY | Price | Action | Break Even | Max Profit | Max Loss | Return % of Risk | Action |
|---|---|---|---|---|---|---|---|---|---|
| | Bid | 50/50 | $0.70 | Sell Spread | | | | | |
| | Xspread | | View Xspreads Book | | | | | | |
| ⊞ Jan 34 / 35 C | QQQQ | | 0.39 | 1.70 | 35.10 | ($10.00) | $110.00 | -9.09% | Trade | Watch | Calc |
| ⊞ Jan 35 / 36 C | QQQQ | | 0.46 | 1.06 | 36.06 | ($6.00) | $106.00 | -5.66% | Trade | Watch | Calc |
| ⊞ Jan 36 / 37 C | QQQQ | | 0.47 | 1.08 | 37.08 | ($8.00) | $108.00 | -7.41% | Trade | Watch | Calc |
| ⊞ Jan 37 / 38 C | QQQQ | | 0.38 | 0.99 | 37.99 | $1.00 | $99.00 | 1.01% | Trade | Watch | Calc |
| ⊞ Jan 38 / 39 C | QQQQ | | 0.42 | 9.97 | 38.97 | $3.00 | $97.00 | 3.09% | Trade | Watch | Calc |
| ⊞ Jan 39 / 40 C | QQQQ | | 0.41 | 0.92 | 39.92 | $8.00 | $92.00 | 8.70% | Trade | Watch | Calc |
| ⊞ Jan 40 / 41 C | QQQQ | | 0.38 | 0.93 | 40.93 | $7.00 | $93.00 | 7.53% | Trade | Watch | Calc |
| ⊞ Jan 41 / 42 C | QQQQ | | 0.32 | 0.88 | 41.88 | $12.00 | $88.00 | 13.64% | Trade | Watch | Calc |

[QQQQ] [Go]   QQQQ NASDAQ   Last 43.74   Change -.08   Bid 43.71 (1)   Ask 43.73 (88)   Vol 107,929,459   Time 16:27:34   chain | trade | chart | more DJIA 12337.22 ▼-10.99  NASDAQ 2306.2 ▼-15.6  S&P500 1348.78 ▼-1.21   Streaming Quotes  ☐ Refresh

POWERSHARES QQQ TRUST SERIES 1                                                    Time & Sales | Chart | Volatility View | News

| Symbol | Last | Change | Bid | Ask | High | Low | Volume | Chart |
|--------|------|--------|-----|-----|------|-----|--------|-------|
| QQQQ | 43.74 | -0.08 ▼ | 43.71 | 43.72 | 44.50 | 43.27 | 110,172,919 | |

Calls Matrix for QQQQ                                                                  ☐ Disable Roll Overs

| Strike | Mar 08 | Apr 08 | May 08 | Jun 08 | Sep 08 | Jan 09 | Jan 10 |
|--------|--------|--------|--------|--------|--------|--------|--------|
| 34.00 | 9.77 / 9.88 | 9.85 / 10.00 | 10.01 / 10.17 | 10.29 / 10.44 | 10.79 / 10.99 | 11.24 / 11.64 | |
| 35.00 | 8.80 / 8.89 | 8.83 / 9.04 | 9.15 / 9.26 | 9.42 / 9.55 | 9.96 / 10.16 | 10.54 / 10.85 | |
| 36.00 | 7.81 / 7.91 | 7.98 / 8.11 | 8.27 / 8.35 | 8.52 / 8.69 | 9.19 / 9.34 | 9.79 / 10.08 | |
| 37.00 | 6.85 / 6.94 | 7.06 / 7.20 | 7.37 / 7.47 | 7.64 / 7.84 | 8.37 / 8.55 | 9.00 / 9.32 | |
| 38.00 | 5.91 / 6.00 | 6.13 / 6.30 | 6.50 / 6.63 | 6.84 / 7.01 | 7.62 / 7.79 | 8.33 / 8.62 | 10.37 / 10.81 |
| 39.00 | 5.00 / 5.08 | 5.27 / 5.44 | 5.67 / 5.81 | 6.11 / 6.22 | 6.88 / 7.05 | 7.65 / 7.91 | 9.76 / 10.18 |
| 40.00 | 4.11 / 4.20 | 4.55 / 4.61 | 4.89 / 5.03 | 5.36 / 5.47 | 6.18 / 6.33 | 6.99 / 7.24 | 9.22 / 9.60 |
| 41.00 | 3.28 / 3.34 | 3.78 / 3.84 | 4.17 / 4.28 | 4.60 / 4.75 | 5.51 / 5.65 | 6.31 / 6.61 | |
| 42.00 | 2.52 / 2.57 | 3.06 / 3.12 | 3.48 / 3.59 | 3.94 / 4.05 | 4.87 / 5.01 | 5.73 / 5.99 | 8.04 / 8.46 |
| 43.00 | 1.84 / 1.89 | 2.41 / 2.46 | 2.83 / 2.95 | 3.29 / 3.41 | 4.28 / 4.41 | 5.26 / 5.41 | |
| 44.00 | 1.26 / 1.27 | 1.82 / 1.87 | 2.29 / 2.36 | 2.77 / 2.85 | 3.74 / 3.84 | 4.60 / 4.87 | 7.00 / 7.39 |
| 45.00 | 0.80 / 0.81 | 1.32 / 1.36 | 1.75 / 1.83 | 2.20 / 2.27 | 3.22 / 3.32 | 4.11 / 4.35 | 6.51 / 6.88 |
| 46.00 | 0.45 / 0.47 | 0.91 / 0.95 | 1.33 / 1.40 | 1.75 / 1.85 | 2.69 / 2.84 | | |
| 47.00 | 0.23 / 0.24 | 0.59 / 0.60 | 0.95 / 1.00 | 1.33 / 1.46 | 2.26 / 2.41 | 3.20 / 3.41 | |
| 48.00 | 0.10 / 0.11 | 0.35 / 0.40 | 0.62 / 0.74 | 1.02 / 1.10 | 1.88 / 2.01 | 2.82 / 3.01 | 5.22 / 5.51 |
| 49.00 | 0.04 / 0.05 | 0.19 / 0.23 | 0.39 / 0.51 | 0.73 / 0.81 | 1.56 / 1.65 | | |
| 50.00 | 0.02 / 0.03 | 0.09 / 0.13 | 0.23 / 0.29 | 0.54 / 0.60 | 1.23 / 1.35 | 2.12 / 2.29 | 4.57 / 4.70 |
| 51.00 | 0.01 / 0.02 | 0.04 / 0.07 | 0.14 / 0.19 | 0.37 / 0.42 | 0.98 / 1.09 | | |
| 52.00 | 0 / 0.01 | 0.03 / 0.04 | 0.07 / 0.12 | 0.24 / 0.30 | 0.81 / 0.87 | 1.53 / 1.68 | 3.71 / 3.97 |
| 53.00 | 0 / 0.01 | 0.01 / 0.02 | 0.04 / 0.07 | 0.16 / 0.20 | 0.58 / 0.68 | | |
| 54.00 | 0 / 0.01 | 0 / 0.03 | 0.01 / 0.04 | 0.09 / 0.13 | 0.44 / 0.53 | | |

| Action | Trade | Trade Calculator | Add to Watch List | Reset |

Comments on our Chains? Let us know                                chain | trade | chart | more

| | QQQQ | Last | Change | Bid | Ask | Vol | Time | |
| | NASDAQ | 43.74 | -.08 | 43.71 (1) | 43.73 (88) | 107,929,459 | 16:27:34 | |

DJIA 12337.22 ▼ -10.99  NASDAQ 2306.2 ▼ -15.6  S&P500 1348.78 ▼ -1.21  Streaming Quotes  ☐ Refresh

| POWERSHARES QQQ TRUST SERIES 1 | | | | | | | | Time & Sales \| Chart \| Volatility View \| News |
|---|---|---|---|---|---|---|---|---|
| Symbol QQQQ | Last 43.74 | Change -0.08▼ | Bid 43.71 | Ask 43.72 | High 44.50 | Low 43.27 | Volume 110,172,919 | Chart 🗠  NASDAQ-100 |

Calls Matrix for QQQ                       ☐ Disable Roll Overs

| Strike | Mar 08 | Apr 08 | May 08 | Jun 08 | Sep 08 | Jan 09 | Jan 10 |
|---|---|---|---|---|---|---|---|
| 34.00 | ☐ 9.77 / 9.88 ☐ | ☐ 9.85 / 10.00 ☐ | ☐ 10.01 / 10.17 ☐ | ☐ 10.29 / 10.44 ☐ | ☐ 10.79 / 10.99 ☐ | ☐ 11.24 / 11.64 ☐ | |
| 35.00 | ☐ 8.80 / 8.89 ☐ | ☐ 8.83 / 9.04 ☐ | ☐ 9.15 / 9.26 ☐ | ☐ 9.42 / 9.55 ☐ | ☐ 9.96 / 10.16 ☐ | ☐ 10.54 / 10.85 ☐ | |
| 36.00 | ☐ 7.81 / 7.91 ☐ | ☐ 7.98 / 8.11 ☐ | ☐ 8.27 / 8.35 ☐ | ☐ 8.52 / 8.69 ☐ | ☐ 9.19 / 9.34 ☐ | ☐ 9.79 / 10.08 ☐ | |
| 37.00 | ☐ 6.85 / 6.94 ☐ | ☐ 7.06 / 7.20 ☐ | ☐ 7.37 / 7.47 ☐ | ☐ 7.64 / 7.84 ☐ | ☐ 8.37 / 8.55 ☐ | ☐ 9.00 / 9.32 ☐ | |
| 38.00 | ☐ 5.91 / 6.00 ☐ | ☐ 6.13 / 6.30 ☐ | ☐ 6.50 / 6.63 ☐ | ☐ 6.84 / 7.01 ☐ | ☐ 7.62 / 7.79 ☐ | ☐ 8.33 / 8.62 ☐ | ☐ 10.37 / 10.81 ☐ |
| 39.00 | ☐ 5.00 / 5.08 ☐ | ☐ 5.27 / 5.44 ☐ | ☐ 5.67 / 5.81 ☐ | ☐ 6.11 / 6.22 ☐ | ☐ 6.88 / 7.05 ☐ | ☐ 7.65 / 7.91 ☐ | ☐ 9.76 / 10.18 ☐ |
| 40.00 | ☐ 4.11 / 4.20 ☐ | ☐ 4.55 / 4.61 ☐ | ☐ 4.89 / 5.03 ☐ | ☐ 5.36 / 5.47 ☐ | ☐ 6.18 / 6.33 ☐ | ☐ 6.99 / 7.24 ☐ | ☐ 9.22 / 9.60 ☐ |
| 41.00 | ☐ 3.28 / 3.34 ☐ | ☐ 3.78 / 3.84 ☐ | ☐ 4.17 / 4.28 ☐ | ☐ 4.60 / 4.75 ☐ | ☐ 5.51 / 5.65 ☐ | ☐ 6.31 / 6.61 ☐ | |
| 42.00 | ☐ 2.52 / 2.57 ☐ | ☐ 3.06 / 3.12 ☐ | ☐ 3.48 / 3.59 ☐ | ☐ 3.94 / 4.05 ☐ | ☐ 4.87 / 5.01 ☐ | ☐ 5.73 / 5.99 ☐ | ☐ 8.04 / 8.46 ☐ |
| 43.00 | ☐ 1.84 / 1.89 ☐ | ☐ 2.41 / 2.46 ☐ | ☐ 2.83 / 2.95 ☐ | ☐ 3.29 / 3.41 ☐ | ☐ 4.28 / 4.41 ☐ | ☐ 5.26 / 5.41 ☐ | |
| 44.00 | ☐ 1.26 / 1.27 ☐ | ☐ 1.82 / 1.87 ☐ | ☐ 2.29 / 2.36 ☐ | ☐ 2.77 / 2.85 ☐ | ☐ 3.74 / 3.84 ☐ | ☐ 4.60 / 4.87 ☐ | ☐ 7.00 / 7.39 ☐ |
| 45.00 | ☐ 0.80 / 0.81 ☐ | ☐ 1.32 / 1.36 ☐ | ☐ 1.75 / 1.83 ☐ | ☐ 2.20 / 2.27 ☐ | ☐ 3.22 / 3.32 ☐ | ☐ 4.11 / 4.35 ☐ | ☐ 6.51 / 6.88 ☐ |
| 46.00 | ☐ 0.45 / 0.47 ☐ | ☐ 0.91 / 0.95 ☐ | ☐ 1.33 / 1.40 ☐ | ☐ 1.75 / 1.85 ☐ | ☐ 2.69 / 2.84 ☐ | | |
| 47.00 | ☐ 0.23 / 0.24 ☐ | ☐ 0.59 / 0.60 ☐ | ☐ 0.95 / 1.00 ☐ | ☐ 1.33 / 1.46 ☐ | ☐ 2.26 / 2.41 ☐ | ☐ 3.20 / 3.41 ☐ | ☐ 5.22 / 5.51 ☐ |
| 48.00 | ☐ 0.10 / 0.11 ☐ | ☐ 0.35 / 0.40 ☐ | ☐ 0.62 / 0.74 ☐ | ☐ 1.02 / 1.10 ☐ | ☐ 1.88 / 2.01 ☐ | ☐ 2.82 / 3.01 ☐ | |
| 49.00 | ☐ 0.04 / 0.05 ☐ | ☐ 0.19 / 0.23 ☐ | ☐ 0.39 / 0.51 ☐ | ☐ 0.73 / 0.81 ☐ | ☐ 1.56 / 1.65 ☐ | | |
| 50.00 | ☐ 0.02 / 0.03 ☐ | ☐ 0.09 / 0.13 ☐ | ☐ 0.23 / 0.29 ☐ | ☐ 0.54 / 0.60 ☐ | ☐ 1.23 / 1.35 ☐ | ☐ 2.12 / 2.29 ☐ | ☐ 4.57 / 4.70 ☐ |
| 51.00 | ☐ 0.01 / 0.02 ☐ | ☐ 0.04 / 0.07 ☐ | ☐ 0.14 / 0.19 ☐ | ☐ 0.37 / 0.42 ☐ | ☐ 0.98 / 1.09 ☐ | | |
| 52.00 | ☐ 0 / 0.01 ☐ | ☐ 0.03 / 0.04 ☐ | ☐ 0.07 / 0.12 ☐ | ☐ 0.24 / 0.30 ☐ | ☐ 0.81 / 0.87 ☐ | ☐ 1.53 / 1.68 ☐ | ☐ 3.71 / 3.97 ☐ |
| 53.00 | ☐ 0 / 0.01 ☐ | ☐ 0.01 / 0.02 ☐ | ☐ 0.04 / 0.07 ☐ | ☐ 0.16 / 0.20 ☐ | ☐ 0.58 / 0.68 ☐ | | |
| 54.00 | ☐ 0 / 0.01 ☐ | ☐ 0 / 0.03 ☐ | ☐ 0.01 / 0.04 ☐ | ☐ 0.09 / 0.13 ☐ | ☐ 0.44 / 0.53 ☐ | | |
| Action | Trade | Trade Calculator | Add to Watch List | Reset | | | |

Comments on our Chains? Let us know

| QQQQ | Go | QQQQ NASDAQ | Last 43.74 | Change -.08 | Bid 43.71 (1) | Ask 43.73 (88) | Vol 107,929,459 | Time 16:27:34 | chain \| trade \| chart \| more |

DJIA 12337.22 ▼ -10.99   NASDAQ 2306.2 ▼ -15.6   S&P500 1348.78 ▼ -1.21    Streaming Quotes   ☐ Refresh

| POWERSHARES QQQ TRUST SERIES 1 | | | | | | | | | Time & Sales | Chart | Volatility View | News |
|---|---|---|---|---|---|---|---|---|---|
| Symbol<br>QQQQ | Last<br>43.74 | Change<br>-0.08▼ | Bid<br>43.69 | Ask<br>43.71 | High<br>44.50 | Low<br>43.27 | Volume<br>110,214,818 | | Chart 📈 NASDAQ:100 |

QQQQ Expiration Months: Mar 08 | Q1 Mar 08 | Apr 08 | May 08 | Jun 08 | Q2 Jun 08 | Sep 08 | Q3 Sep 08 | 04 Dec 08 | Dec 08 | Jan 09 | Q4 Dec 09 | Jan 10

| | | | Calls | | | | | | | | | Puts | | | | | ☐ Disable Roll Overs |
|---|---|---|---|---|---|---|---|---|---|---|---|---|---|---|---|---|---|
| | Mar 08 Calls | | | | | (31 days to expiration) | | | | | | | | | | | Mar 08 Puts |
| Symbol | Last | Chg | Bid | Ask | Vol | Opint | Action | Strike | Symbol | Last | Chg | Bid | Ask | Vol | Opint | Action |
| | | | | | | | | QQQQ @ 43.74 | | | | | | | | |
| .QAVCH | 9.37 | -1.39 | 9.77 | 9.88 | 11 | 3,268 | Trade ☐ | 34.00 | .QAVOH | 0.04 | 0.01 | 0.03 | 0.04 | 39 | 9,151 | Trade ☐ |
| .QQQCI | 8.63 | -0.04 | 8.80 | 8.89 | 10 | 1,828 | Trade ☐ | 35.00 | .QQQOI | 0.04 | -0.01 | 0.03 | 0.05 | 65 | 55,455 | Trade ☐ |
| .QQQCJ | 8.32 | -0.16 | 7.81 | 7.91 | 15 | 3,665 | Trade ☐ | 36.00 | .QQQOJ | 0.06 | -0.02 | 0.05 | 0.07 | 40 | 5,951 | Trade ☐ |
| .QQQCK | 6.80 | -0.35 | 6.85 | 6.94 | 104 | 3,235 | Trade ☐ | 37.00 | .QQQOK | 0.11 | 0.01 | 0.10 | 0.11 | 212 | 20,185 | Trade ☐ |
| .QQQCL | 5.70 | -0.34 | 5.91 | 6.00 | 121 | 3,680 | Trade ☐ | 38.00 | .QQQOL | 0.16 | 0 | 0.15 | 0.16 | 2,841 | 14,989 | Trade ☐ |
| .QQQCM | 4.85 | -0.02 | 5.00 | 5.08 | 96 | 5,746 | Trade ☐ | 39.00 | .QQQOM | 0.23 | -0.02 | 0.22 | 0.23 | 32,308 | 48,110 | Trade ☐ |
| .QQQCN | 4.12 | -0.11 | 4.11 | 4.20 | 655 | 14,423 | Trade ☐ | 40.00 | .QQQON | 0.35 | -0.01 | 0.34 | 0.35 | 2,961 | 136,502 | Trade ☐ |
| .QQQCO | 3.27 | -0.15 | 3.28 | 3.34 | 1,366 | 9,224 | Trade ☐ | 41.00 | .QQQOO | 0.51 | -0.04 | 0.49 | 0.51 | 39,805 | 54,317 | Trade ☐ |
| .QQQCP | 2.57 | -0.11 | 2.52 | 2.57 | 15,166 | 19,128 | Trade ☐ | 42.00 | .QQQOP | 0.75 | -0.01 | 0.73 | 0.76 | 14,381 | 93,149 | Trade ☐ |
| .QQQCQ | 1.82 | -0.16 | 1.84 | 1.89 | 12,812 | 31,551 | Trade Ⓑ | 43.00 | .QQQOQ | 1.05 | 0 | 1.05 | 1.08 | 51,239 | 134,383 | Trade ☐ |
| .QQQCR | 1.27 | -0.10 | 1.26 | 1.27 | 37,754 | 37,153 | Trade Ⓑ | 44.00 | .QQQOR | 1.48 | 0 | 1.47 | 1.50 | 57,661 | 189,514 | Trade ☐ |
| .QQQCS | 0.81 | -0.09 | 0.80 | 0.81 | 70,717 | 93,800 | Trade ☐ | 45.00 | .QQQOS | 2.06 | 0.06 | 1.98 | 2.03 | 19,443 | 188,397 | Trade ☐ |
| .QQQCT | 0.45 | -0.07 | 0.45 | 0.47 | 19,431 | 71,215 | Trade ☐ | 46.00 | .QQQOT | 2.79 | 0.19 | 2.65 | 2.69 | 18,076 | 42,295 | Trade ☐ |
| .QQQCU | 0.23 | -0.05 | 0.23 | 0.24 | 27,455 | 99,603 | Trade ☐ | 47.00 | .QQQOU | 3.73 | 0.32 | 3.41 | 3.47 | 2,943 | 286,856 | Trade ☐ |
| .QQQCV | 0.10 | -0.04 | 0.10 | 0.11 | 16,819 | 40,532 | Trade ☐ | 48.00 | .QQQOV | 4.70 | 0.42 | 4.32 | 4.37 | 932 | 97,181 | Trade ☐ |
| .QQQCW | 0.05 | -0.02 | 0.04 | 0.05 | 1,834 | 72,496 | Trade ☐ | 49.00 | .QQQOW | 5.70 | 0.48 | 5.22 | 5.33 | 296 | 168,059 | Trade ☐ |
| .QQQCX | 0.02 | -0.01 | 0.02 | 0.03 | 3,095 | 118,995 | Trade ☐ | 50.00 | .QQQOX | 6.70 | 0.50 | 6.21 | 6.30 | 494 | 105,971 | Trade ☐ |
| .QQQCY | 0.02 | 0 | 0.01 | 0.02 | 922 | 39,965 | Trade ☐ | 51.00 | .QQQOY | 7.70 | 0.23 | 7.20 | 7.30 | 04 | 11,156 | Trade ☐ |
| .QQQCZ | 0.01 | 0 | 0 | 0.01 | 433 | 43,336 | Trade ☐ | 52.00 | .QQQOZ | 8.53 | 0.34 | 8.20 | 8.30 | 16 | 36,381 | Trade ☐ |
| .QQQCA | 0.01 | -0.01 | 0 | 0.01 | 30 | 23,650 | Trade ☐ | 53.00 | .QQQOA | 9.20 | -0.16 | 9.21 | 9.30 | 16 | 225 | Trade ☐ |
| .QQQCB | 0.01 | 0 | 0 | 0.01 | 162 | 54,779 | Trade ☐ | 54.00 | .QQQOB | 9.60 | -0.86 | 10.20 | 10.32 | 01 | 1,515 | Trade ☐ |

| Action | | | Trade Calculator | | Mini Pricer | | | Add to Watch List | | | Reset | | | | | ⊟ |

| | QQQQ Go | Trade | | QQQQ<br>NASDAQ | Last<br>43.74 | Change<br>-.08 | | Bid<br>43.71 (1) | Ask<br>43.73 (88) | | Vol<br>107,929,459 | Time<br>16:27:34 | | | | |

DJIA 12397.22▼-10.99 / NASDAQ 2306.2▼/15.6 S&P500 1348.78▼1.21 | Streaming Quotes | ☐ Refresh | chain | trade | chart | more

FIG. 10A

| Symbol | Last | Change | Bid | Ask | High | Low | Volume |
|---|---|---|---|---|---|---|---|
| QQQQ | 43.74 | -0.08 ▼ | 43.69 | 43.71 | 44.50 | 43.27 | 110,214,818 |

POWERSHARES QQQ TRUST SERIES 1     Time & Sales | Chart | Volatility View | News QQQQ Expiration Months: Mar 08 | Q1 Mar 08 | Apr 08 | May 08 | Jun 08 | Q2 Jun 08 | Sep 08 | Q3 Sep 08 | Q4 Dec 08 | Jan 09 | Q4 Dec 09 | Jan 10

☐ Disable Roll Overs

Mar 08 Calls / Mar 08 Puts (31 days to expiration)

| Symbol | Last | Chg | Bid | Ask | Vol | Opint | Action | Strike | Symbol | Last | Chg | Bid | Ask | Vol | Opint | Action |
|---|---|---|---|---|---|---|---|---|---|---|---|---|---|---|---|---|
| | | | | | | | | QQQQ @ 43.74 | | | | | | | | |
| .QAVCH | 9.37 | -1.39 | 9.77 | 9.88 | 11 | 3,268 | Trade ☐ | 34.00 | .QAVOH | 0.04 | 0.01 | 0.03 | 0.04 | 39 | 9,151 | Trade ☐ |
| .QQQCI | 8.63 | -0.04 | 8.80 | 8.89 | 10 | 1,828 | Trade ☐ | 35.00 | .QQQOI | 0.04 | -0.01 | 0.03 | 0.05 | 65 | 55,455 | Trade ☐ |
| .QQQCJ | 8.32 | -0.16 | 7.81 | 7.91 | 15 | 3,665 | Trade ☐ | 36.00 | .QQQOJ | 0.06 | -0.02 | 0.05 | 0.07 | 40 | 5,951 | Trade ☐ |
| .QQQCK | 6.80 | -0.35 | 6.85 | 6.94 | 104 | 3,235 | Trade ☐ | 37.00 | .QQQOK | 0.11 | 0.01 | 0.10 | 0.11 | 212 | 20,185 | Trade ☐ |
| .QQQCL | 5.70 | -0.34 | 5.91 | 6.00 | 121 | 3,680 | Trade ☐ | 38.00 | .QQQOL | 0.16 | 0 | 0.15 | 0.16 | 2,841 | 14,989 | Trade ☐ |
| .QQQCM | 4.85 | -0.02 | 5.00 | 5.08 | 96 | 5,746 | Trade ☐ | 39.00 | .QQQOM | 0.23 | -0.02 | 0.22 | 0.23 | 32,308 | 48,110 | Trade ☐ |
| .QQQCN | 4.12 | -0.11 | 4.11 | 4.20 | 655 | 14,423 | Trade ☐ | 40.00 | .QQQON | 0.35 | -0.01 | 0.34 | 0.35 | 2,961 | 136,502 | Trade ☐ |
| .QQQCO | 3.27 | -0.15 | 3.28 | 3.34 | 1,366 | 9,224 | Trade ☐ | 41.00 | .QQQOO | 0.51 | -0.04 | 0.49 | 0.51 | 39,805 | 54,317 | Trade ☐ |
| .QQQCP | 2.57 | -0.11 | 2.52 | 2.57 | 15,166 | 19,128 | Trade ☐ | 42.00 | .QQQOP | 0.75 | -0.01 | 0.73 | 0.76 | 14,381 | 93,149 | Trade ☐ |
| .QQQCQ | 1.82 | -0.16 | 1.84 | 1.89 | 12,812 | 31,551 | Trade ☐ | 43.00 | .QQQOQ | 1.05 | 0 | 1.05 | 1.08 | 51,239 | 134,383 | Trade ☐ |
| .QQQCR | 1.27 | -0.10 | 1.26 | 1.27 | 37,754 | 37,153 | Trade ☐ | 44.00 | .QQQOR | 1.48 | 0 | 1.47 | 1.50 | 57,661 | 189,514 | Trade ☐ |
| .QQQCS | 0.81 | -0.09 | 0.80 | 0.81 | 70,717 | 93,800 | Trade ☐ | 45.00 | .QQQOS | 2.06 | 0.06 | 1.98 | 2.03 | 19,443 | 188,397 | Trade ☐ |
| .QQQCT | 0.45 | -0.07 | 0.45 | 0.47 | 19,431 | 71,215 | Trade ☐ | 46.00 | .QQQOT | 2.79 | 0.19 | 2.65 | 2.69 | 18,076 | 42,295 | Trade ☐ |
| .QQQCU | 0.23 | -0.05 | 0.23 | 0.24 | 27,455 | 99,603 | Trade ☐ | 47.00 | .QQQOU | 3.73 | 0.32 | 3.41 | 3.47 | 2,943 | 286,856 | Trade ☐ |
| .QQQCV | 0.10 | -0.04 | 0.10 | 0.11 | 16,819 | 40,532 | Trade ☐ | 48.00 | .QQQOV | 4.70 | 0.42 | 4.32 | 4.37 | 932 | 97,181 | Trade ☐ |
| .QQQCW | 0.05 | -0.02 | 0.04 | 0.05 | 1,834 | 72,496 | Trade ☐ | 49.00 | .QQQOW | 5.70 | 0.48 | 5.22 | 5.33 | 296 | 168,059 | Trade ☐ |
| .QQQCX | 0.02 | -0.01 | 0.02 | 0.03 | 3,095 | 118,995 | Trade ☐ | 50.00 | .QQQOX | 6.70 | 0.50 | 6.21 | 6.30 | 494 | 105,971 | Trade ☐ |
| .QQQCY | 0.02 | 0 | 0.01 | 0.02 | 922 | 39,965 | Trade ☐ | 51.00 | .QQQOY | 7.70 | 0.23 | 7.20 | 7.30 | 04 | 11,156 | Trade ☐ |
| .QQQCZ | 0.01 | 0 | 0 | 0.01 | 433 | 43,336 | Trade ☐ | 52.00 | .QQQOZ | 8.53 | 0.34 | 8.20 | 8.30 | 16 | 36,381 | Trade ☐ |
| .QQQCA | 0.01 | -0.01 | 0 | 0.01 | 30 | 23,650 | Trade ☐ | 53.00 | .QQQOA | 9.20 | -0.16 | 9.21 | 9.30 | 16 | 225 | Trade ☐ |
| .QQQCB | 0.01 | 0 | 0 | 0.01 | 162 | 54,779 | Trade ☐ | 54.00 | .QQQOB | 9.60 | -0.86 | 10.20 | 10.32 | 01 | 1,515 | Trade ☐ |

Action: Trade | Trade Calculator | Mini Pricer | Add to Watch List | Reset

QQQQ Expiration Months: Mar 08 | Q1 Mar 08 | Apr 08 | May 08 | Jun 08 | Q2 Jun 08 | Sep 08 | Q3 Sep 08 | 04 Dec 08 | Jan 09 | Q4 Dec 09 | Jan 10    ☐ Disable Roll Overs

| | | | Calls | | | | Strike | Symbol | | | Puts | | | |
|---|---|---|---|---|---|---|---|---|---|---|---|---|---|---|
| Symbol | Last | Chg | Bid | Ask | Vol | Opint | Action | | | Last | Chg | Bid | Ask | Vol | Opint | Action |
| ☐ | Mar 08 Calls | | | | | | | | | | | | | | Mar 08 Puts |
| | | | | | | (31 days to expiration) | | QQQQ @ 43.74 | | | | | | | |
| .QAVCH | 9.37 | -1.39 | 9.77 | 9.88 | 11 | 3,268 | Trade ☐ | 34.00 | .QAVOH | 0.04 | 0.01 | 0.03 | 0.04 | 39 | 9,151 | Trade ☐ |
| .QQQCI | 8.63 | -0.04 | 8.80 | 8.89 | 10 | 1,828 | Trade ☐ | 35.00 | .QQQOI | 0.04 | -0.01 | 0.03 | 0.05 | 65 | 55,455 | Trade ☐ |
| .QQQCJ | 8.32 | -0.16 | 7.81 | 7.91 | 15 | 3,665 | Trade ☐ | 36.00 | .QQQOJ | 0.06 | -0.02 | 0.05 | 0.07 | 40 | 5,951 | Trade ☐ |
| .QQQCK | 6.80 | -0.35 | 6.85 | 6.94 | 104 | 3,235 | Trade ☐ | 37.00 | .QQQOK | 0.11 | 0.01 | 0.10 | 0.11 | 212 | 20,185 | Trade ☐ |
| .QQQCL | 5.70 | -0.34 | 5.91 | 6.00 | 121 | 3,680 | Trade ☐ | 38.00 | .QQQOL | 0.16 | 0 | 0.15 | 0.16 | 2,841 | 14,989 | Trade ☐ |
| .QQQCM | 4.85 | -0.02 | 5.00 | 5.08 | 96 | 5,746 | Trade ☐ | 39.00 | .QQQOM | 0.23 | -0.02 | 0.22 | 0.23 | 32,308 | 48,110 | Trade ☐ |
| .QQQCN | 4.12 | -0.11 | 4.11 | 4.20 | 655 | 14,423 | Trade ☐ | 40.00 | .QQQON | 0.35 | -0.01 | 0.34 | 0.35 | 2,961 | 136,502 | Trade ☐ |
| .QQQCO | 3.27 | -0.15 | 3.28 | 3.34 | 1,366 | 9,224 | Trade ☐ | 41.00 | .QQQOO | 0.51 | -0.04 | 0.49 | 0.51 | 39,805 | 54,317 | Trade ☐ |
| .QQQCP | 2.57 | -0.11 | 2.52 | 2.57 | 15,166 | 19,128 | Trade ☐ | 42.00 | .QQQOP | 0.75 | -0.01 | 0.73 | 0.76 | 14,381 | 93,149 | Trade ☐ |
| .QQQCQ | 1.82 | -0.16 | 1.84 | 1.89 | 12,812 | 31,551 | Trade Ⓑ | 43.00 | .QQQOQ | 1.05 | 0 | 1.05 | 1.08 | 51,239 | 134,383 | Trade ☐ |
| .QQQCR | 1.27 | -0.10 | 1.26 | 1.27 | 37,754 | 37,153 | Trade Ⓢ | 44.00 | .QQQOR | 1.48 | 0 | 1.47 | 1.50 | 57,661 | 189,514 | Trade ☐ |
| .QQQCS | 0.81 | -0.09 | 0.80 | 0.81 | 70,717 | 93,800 | Trade Ⓑ | 45.00 | .QQQOS | 2.06 | 0.06 | 1.98 | 2.03 | 19,443 | 188,397 | Trade ☐ |
| .QQQCT | 0.45 | -0.07 | 0.45 | 0.47 | 19,431 | 71,215 | Trade ☐ | 46.00 | .QQQOT | 2.79 | 0.19 | 2.65 | 2.69 | 18,076 | 42,295 | Trade ☐ |
| .QQQCU | 0.23 | -0.05 | 0.23 | 0.24 | 27,455 | 99,603 | Trade ☐ | 47.00 | .QQQOU | 3.73 | 0.32 | 3.41 | 3.47 | 2,943 | 286,856 | Trade ☐ |
| .QQQCV | 0.10 | -0.04 | 0.10 | 0.11 | 16,819 | 40,532 | Trade ☐ | 48.00 | .QQQOV | 4.70 | 0.42 | 4.32 | 4.37 | 932 | 97,181 | Trade ☐ |
| .QQQCW | 0.05 | -0.02 | 0.04 | 0.05 | 1,834 | 72,496 | Trade ☐ | 49.00 | .QQQOW | 5.70 | 0.48 | 5.22 | 5.33 | 296 | 168,059 | Trade ☐ |
| .QQQCX | 0.02 | -0.01 | 0.02 | 0.03 | 3,095 | 118,995 | Trade ☐ | 50.00 | .QQQOX | 6.70 | 0.50 | 6.21 | 6.30 | 494 | 105,971 | Trade ☐ |
| .QQQCY | 0.02 | 0 | 0.01 | 0.02 | 922 | 39,965 | Trade ☐ | 51.00 | .QQQOY | 7.70 | 0.23 | 7.20 | 7.30 | 04 | 11,156 | Trade ☐ |
| .QQQCZ | 0.01 | 0 | 0 | 0.01 | 433 | 43,336 | Trade ☐ | 52.00 | .QQQOZ | 8.53 | 0.34 | 8.20 | 8.30 | 16 | 36,381 | Trade ☐ |
| .QQQCA | 0.01 | -0.01 | 0 | 0.01 | 30 | 23,650 | Trade ☐ | 53.00 | .QQQOA | 9.20 | -0.16 | 9.21 | 9.30 | 16 | 225 | Trade ☐ |
| .QQQCB | 0.01 | 0 | 0 | 0.01 | 162 | 54,779 | Trade ☐ | 54.00 | .QQQOB | 9.60 | -0.86 | 10.20 | 10.32 | 01 | 1,515 | Trade ☐ |
| Action | Trade | | Trade Calculator | | | Mini Pricer | | Add to Watch List | | | Reset | | | | 84 |
| Comments on our Chains? | | | | | | | | | | | | | | | |

TRADING SYSTEM AND METHODS

This application claims the benefit of U.S. Provisional Application No. 60/904,028 filed Feb. 28, 2007.

FIELD OF THE INVENTION

The present invention is related to the field of trading, and, more specifically, to an improved mode of online communication by which the trading of an item utilizing certain embodiments, a single screen is facilitated.

BACKGROUND OF THE INVENTION

Those engaging in the trading of items through the online access of a computer system often need additional information to determine the details of that which is being offered as the subject of the trade, to gauge the merits of the trade, and possibly plan a more involved trading strategy. For purposes of this application, the term "trading" includes the transfer of any consideration for the subject of the trade—termed "item" herein—and the ordering of one or more items. An "item" may be anything of value including a financial security, for example, stocks, commodities, bonds and derivatives such as futures, forwards, options, and swaps. A "customer" is any individual or entity that may, or does engage in the trading of items whose value varies according to market perception such as coins, stamps, books, objects of fine art, craftsmanship, and those having historical significance, among others. A customer is also referred to herein as an investor for purposes of this application. The present invention has application to all such items, including properties and securities, that may be bought and sold in a generally open marketplace at a price that varies according to market perception, including with respect to the trading of stock equity options. Embodiments of the present invention will be described by reference to one type of item—security options—but has utility with respect to all items.

Security options—such as stock options—are essentially contract rights that can be bought and sold on the open market. By paying a certain premium amount, the owner of an option acquires the right to buy or sell the underlying security at a designated strike price during a limited period of time prior to expiration of the option. Buyers and sellers of options are termed "holders" and "writers", respectively. A "call option" is an option to buy a certain security at a specific price on or before a certain date. If the underlying security increases in value over the strike price, the value of the call option then increases, as well. The owner of a call option may exercise the right to purchase the security before the expiration date of the option, logically whenever the security exceeds the strike price, at which time the option seller becomes obligated to sell the security. If the security does not exceed the strike price, the owner has lost nothing more than the price paid for the option, or the option premium. A "put option" is an option to sell a security at a specific price on or before a certain date. The owner of a put option may exercise the right to sell the security before the expiration date of the option, logically whenever the security falls beneath the strike price, at which time the option seller becomes obligated to buy the security. If the security does not fall beneath the strike price, the owner has again lost nothing more than the option premium.

To offset potential financial liabilities that might otherwise accrue from changes in the value of an underlying security, investors often seek to acquire option rights as a type of financial insurance policy. Similar to paying an insurance premium, the cost of buying call options becomes a standard business expense, required for proper risk management. In like manner, investors sell put options to obtain a calculable minimum return on investments as a means for ensuring against financial risk. Separate and apart from their risk management function, security options may furthermore provide investors with a potentially lucrative trading instrument, allowing for investment in the performance of the underlying security with a lesser amount of investment capital required.

Investing in options typically requires specialized financial knowledge. Without it, individual investors may not be aware of the benefits and opportunities that trading in certain options provide, nor the range of possible trading strategies. However, the average individual investor typically does not have access to the same quantity and quality of market information that is ordinarily available to those routinely involved in trading options.

Securities web sites are popular because they allow investors to manage investment information. Financial institutions, including brokerages, have implemented online services that allow investors to engage in trading of various securities over data communication networks, including the Internet. As used herein, the terms "order", "trade", and/or "trading" generally refers to transactions such as buying and/or selling. Any investor having access to the Internet may more directly engage in trading activity without having the need to speak to a broker to enter his or her orders in the marketplace for execution.

In addition to the many advantages that may be realized in standard accounting procedures, brokerage firms dealing in financial securities have sought to expand their capabilities for improved interactive computerized communication with their individual retail account investors. Prior to the appearance of the Internet, trading orders from such retail investor clients could be communicated only in person or via telephone, whether using voice or fax transmission, or by delivery of the order through conventional means such as the postal mail. Processing such trade orders typically would require a certain amount of time—minimally from perhaps a few minutes to as much as several hours or more—thereby resulting in a lag in the amount of time before the trade was executed. More recently, online communication capabilities have made it possible for individual investors of financial brokerage firms to have trade orders entered and executed more rapidly, thereby decreasing the lag time to at times less than one minute of lag time between the investor completing the entry of the order online and receiving a reply confirming an online trade confirmation communicated electronically.

In addition, and in further contradistinction to the fairly limited range of standard and traditional types of trading modalities that were previously available to their retail clients, brokerage firms have begun to offer expanded modes of interactive communication and a greater range of trading information, thereby permitting individuals great control over their accounts.

However, while more and more information becomes available online, the information often takes a great amount of time and effort to access. Navigating to the various levels of information then back to the screen at which the trade is executed is often difficult and fraught with danger. Getting lost in these levels of information may be a typical occurrence. Remembering what is relevant to the trade while navigating back to the screen at which the trade is executed is a challenge to most investors.

Therefore a need exists for a system and methods by which a wide variety of information may be provided to an investor readily and, in certain embodiments, without navigating away from the screen at which the trade can be executed. The present invention satisfies the demand.

SUMMARY OF THE INVENTION

In one embodiment, the present invention is a method for facilitating trading in one or more items by a customer. Items include anything of value including a financial security, for example, stocks, commodities, bonds and derivatives such as futures, forwards, options, and swaps. A "customer" is any individual or entity that may, or does engage in the trading of items, for example, an investor, trader, buyer, seller, holder, or writer to name a few. According to the present invention, certain embodiments permit the customer to determine the merits of and to execute a trade from a single screen.

One embodiment of the present invention provides information in the form of an option chain trading screen. An option chain is a matrix that provides quote options prices through a list of all of the options for a given security, including the various strike prices, expiration dates, and whether they are calls or puts. The option chain provides a single screen for the following types of chains for a particular security: "calls and puts", "calls", "puts", "call matrix", "put matrix", "pricer", "straddles", "strangles", "covered calls", "call spreads", "put spreads", "collars", "calendar call spreads", "calendar put spreads", "diagonal call spreads", "diagonal put spreads", "implied volatility", "butterfly call spread", "butterfly put spread", "iron condor spread", "combos (short put/long call)", "futures chain", "futures options" and "option chains". An option chain trading screen enables a customer to view a matrix of all available options for a given security, including the various strike prices, expiration dates, and whether they are calls or puts. All calls and puts for a particular security are viewed in a single screen along with information on each call and put, for example, bids and asks for each strike price and month. The present invention includes an embodiment that includes a matrix through the use of which a customer is able to view a plurality of available options for the item.

The present invention is directed to a system and methods by which an investor can engage in the fully informed trading of a security utilizing a single screen that presents a wide variety of information pertinent to a contemplated trade through a "hover" or "roll over" feature. An embodiment according to the present invention provides a customer with a single option chain trading screen allowing a customer to "hover" at or near various icons to obtain supplemental information without leaving the trading screen. For purposes of this application, an icon is any representation, including a picture, image, region, link, hyperlink, field, symbol, area, button, or checkbox. As the customer hovers at or near an icon, supplemental information is offered. For example, "hover" features or "roll over" features include the display of a chart, a percentage of the price of the option that is an intrinsic value, a percentage of the price of the option that is a time value, a real-time quote book, a "Greeks" book, a quote box, a trade calculator, a price improvement box, a watch list, a pricing ticket, a theoretical buying power box, or a trade ticket to name a few. The customer simply places the screen indicator over an icon that activates a pop-up of supplemental information. The pop-up floats or levitates in the form of an inset in the option trading screen. The "hover" feature of the present invention allows the investor to maintain a single screen—the trading screen—thereby eliminating the need to scroll or access more than one trading or information screen.

In another embodiment, the present invention includes a selection using what is termed for purposes of this application "triple-action". "Action" includes any physical activity to identify a selection, for example, clicks of a mouse, presses of a button, or strikes on a keyboard. In one embodiment, a triple-action selection formulates a trade by a customer as follows: a customer uses a mouse to click an icon once to denote a "buy"; the customer clicks an icon twice to denote a "sell"; and, the customer clicks an icon three times to denote a "reset". Triple-action selection is advantageous in that it allows an investor to make multiple option selections at once. This allows a customer to build a trade more quickly and easily.

Another embodiment provides a customer with a single option chain trading screen allowing a customer to use a triple-action selection component to formulate a strategy and ultimately execute a trade. For example, multi-leg strategies, or spreads, are provided by clicking, or selecting, an icon next to the option. A "spread" is a limited risk, limited reward strategy established by combining options that would, if separate, profit from opposite moves in the price of the underlying. A "vertical spread" is identified by selecting checkboxes for options that have the same expiration but different strike prices. A "horizontal spread" is also known as a time or calendar spread. This spread is identified, and thereby established by selecting checkboxes for options with different expirations but the same strike price. A "diagonal spread" is identified, and thereby established by selecting checkboxes for options with different strike prices and expirations. It should be noted that in certain embodiments the sequence in which the customer selects checkboxes does not indicate any particular weight in the ultimate trading decision.

It is an added object of the present invention to provide smart logic such that the investor is directed to the appropriate trade ticket based on the selections made for the particular option(s). For example, smart logic is an algorithm that determines whether the trade is a single leg trade, butterfly, condor, straddle, spread or multi-trade. A "single leg trade" involves a trade of only one option by an investor. A "butterfly" is a limited risk, limited reward strategy that involves four options (all calls or all puts) at three different strike prices. A "condor" is a limited risk, limited reward strategy with profit/loss characteristics similar to a butterfly, but in this case, four options at four strike prices are used. A "straddle" is an option position in which a call and a put with the same strike price and expiration are both bought ("long" straddle) or sold ("short" straddle). A long straddle has unlimited profit potential given a large move up or down. A short straddle has limited profit (if the stock remains stable) and unlimited risk (if the stock moves significantly in either direction. A spread may be vertical, horizontal or diagonal. A multi-trade involves five or more options.

According to one embodiment of the present invention, a system includes a client system and a server system that are connected via a communications link. The client system includes a display component for displaying the plurality of icons as well as the supplemental information that can be accessed by the customer by hovering at or near one or more icons. A server system receives data via the communications link from the client system. Data includes, for example, a trade ticket as well as the fulfillment and execution of the trade of the one or more items.

These, together with other objects and advantages, will be further understood in the details of the construction and operation of the invention as more fully hereinafter described, and with reference to the accompanying drawings, forming a part hereof, wherein the numerals refer to the like part throughout.

BRIEF DESCRIPTION OF THE DRAWINGS

FIG. 1 is an option chain trading screen according to the present invention;

FIG. 3B is an option chain trading screen illustrating a Greek book "roll over" feature according to the present invention;

FIG. 5 is an option chain trading screen illustrating a quote box "roll over" feature according to the present invention;

FIG. 6A is an option chain trading screen illustrating a border element according to the present invention;

FIG. 6B is an option chain trading screen illustrating a price improvement box "roll over" feature according to the present invention;

FIG. 7 is an option chain trading screen illustrating a multi-leg strategy of a horizontal spread according to the present invention;

FIG. 9 is an option chain trading screen illustrating a multi-leg strategy of a diagonal spread according to the present invention;

FIG. 10A is an option chain trading screen illustrating trade manage buttons according to the present invention;

FIG. 11A is an option chain trading screen illustrating trade manage buttons according to the present invention;

FIG. 12C is an option chain trading screen illustrating a theoretical buying power box "roll over" feature according to the present invention;

FIG. 13A is an option chain trading screen illustrating trade manage buttons according to the present invention;

FIG. 13B is an option chain trading screen illustrating a multi-trade ticket according to the present invention;

DETAILED DESCRIPTION OF THE PRESENTLY-PREFERRED EMBODIMENTS

Figure 2:
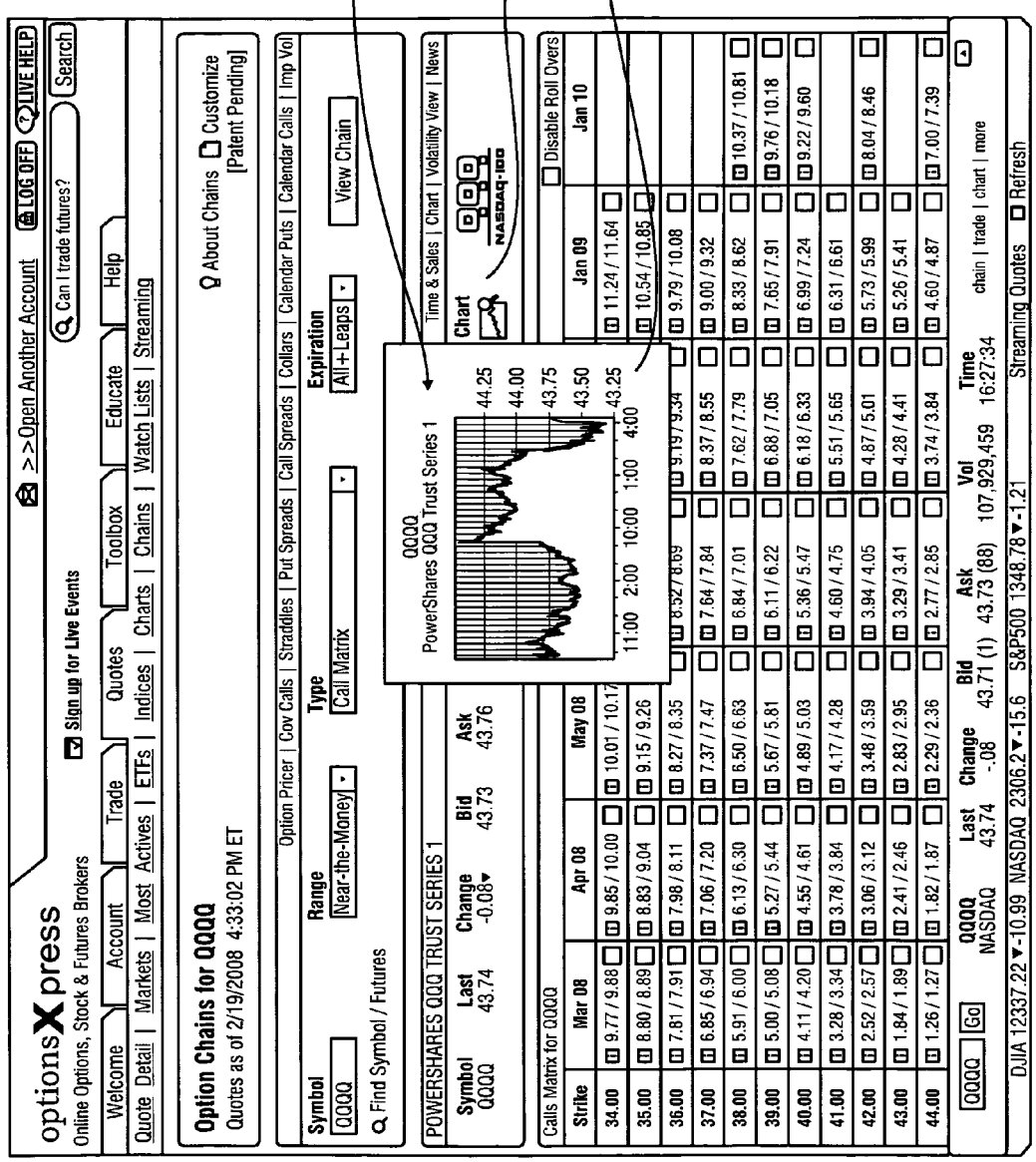
FIG. 2 is an option chain trading screen illustrating a chart "roll over" feature according to the present invention.

The system and methods of the present invention will be discussed in the following with respect to the trading of security options, more particularly a stock option. However, the present invention can be used to facilitate more fully informed trading of any security or any item of value.

FIG. 1 illustrates an option chain trading screen 50. The screen 50 permits a customer to populate fields 205 within a security information box 200 on the screen 50 by typing in information, by selecting from a drop-down menu, or by selecting a button. For purposes of this application, the term "customer" includes anyone utilizing the system and methods according to the present invention, for example, an investor, trader, buyer, seller, holder, or writer to name a few. As shown in FIG. 1, a customer populates security information fields 205 within a security information box 200 including symbol 210, range 230, type of option chain 250, and expiration of the option 270. Symbol 210 is a mnemonic used to uniquely identify a particular security, here a stock. Range 230 includes "near-the-money", "in the money", and "out of the money". Usually, an "in the money" option goes up at the same rate as the stock price. A "near the money" option usually goes up at half of the rate of the stock price. An "out of the money" option typically goes up very little compared to the stock price. Types 250 of option chains include "calls and puts", "calls", "puts", "call matrix", "put matrix", "pricer", "straddles", "strangles", "covered calls", "call spreads", "put spreads", "collars", "calendar call spreads", "calendar put spreads", "diagonal call spreads", "diagonal put spreads", "implied volatility", "butterfly call spread", "butterfly put spread", "iron condor spread", "combos (short put/long call)", "futures chain", "futures options" and "option chains". The expiration field 270 includes the month and year the offer—to either buy or sell—of an option terminates. Upon populating these fields 205 within the security information box 200, the investor selects the "view chain" button 290 to view the quote box 300 and matrix chain box 400 according to the symbol 210 and type of option chain selected in field 250.

The screen 50 includes a quote box 300. The quote box 300 includes regions 305 of symbol 310, last 312, change 314, bid 316, ask 318, high 320 (not shown), low 322 (not shown), volume 324 and chart 326. Symbol 310, again, is the mnemonic corresponding to that entered in field 210 of the security information box 200. Last 312 is merely the last bid or ask that was previously entered. Change 314 is the percent difference between the bid 316 and the ask 318. Bid 316 is the price point at which a buyer is willing to purchase the given stock, or sell price. Ask 318 or buy price is the price point where a seller would be willing to sell the given stock. High 320 is the highest price recorded for the trade day whereas low 322 is the lowest price recorded. Volume 324 is the number of shares traded for the particular security, or symbol 310. Chart 326 is a "hover" or "roll over" feature, such that the investor can display a one-day chart of the stock symbol 310, as shown in FIG. 2.

Trading screen 50 also displays the matrix chain box 400, which is a matrix of price quotes through a list of all options, illustrated as option symbols 410 for a given security including strike prices, expiration dates and whether they are calls 403 or puts 404. The matrix chain box 400 includes expiration month links 402. Each expiration month link 402 is an icon that can be selected to access supplemental information. The expiration month link 402 can be selected for further detail on the option as shown in matrix chain box 400. Matrix chain box 400 displays all available option symbols 410, including various information for each option symbol 410, in one page. The information includes, for example, last 412, change 414, bid 416, ask 418, volume 420, open interest 422 which is the number of option contracts that are open for buy or sell, and strike price 424.

FIG. 2 is an option chain trading screen 51 illustrating a "hover" feature 500. In this embodiment, the hover over feature 500 is a chart 510. An investor can obtain an expanded chart 510 of the security symbol 210 or 310 (see FIG. 1) by "rolling over" the chart region 326. It is contemplated that the "roll over" chart feature 510 is available for any type 250 (see FIG. 1) of option chain selected. The "roll over" chart feature 510 displays a one-day stock price versus time, although other features are contemplated, for example, a five-day stock price or three month stock price.

Figure 3A:
FIG. 3A is an option chain trading screen illustrating a real-time quote book "roll over" feature according to the present invention.

FIG. 3A is an option chain trading screen 52 illustrating another "hover" feature 500 of a real-time quote book 520 for a specific option. An investor can obtain a real-time quote book 520 of the option by "rolling over" the option symbol 410 in the matrix chain box 400 (see FIG. 1). It is contemplated that the "hover" quote book feature 520 is available for any type 250 (see FIG. 1) of option chain selected. The "hover" quote book feature 520 displays size and quote for the option symbol 410 the investor "rolled over", here .OZCAN.

FIG. 3B is an option chain trading screen 53 illustrating another "roll over" feature 500 of a "Greeks" book 530 for a specific option. An investor can obtain a "Greeks" book 530 of the option by "rolling over" a Greeks link 531. The "hover" "Greeks" book feature 510 displays quantities representing the market sensitivities such as implied volatility and Greeks values, such as Delta, Gamma, Rho, Theta and Vega. An investor can switch back the real-time quote book 520 (FIG. 3A) by rolling over a quote book link 532.

Figure 4:
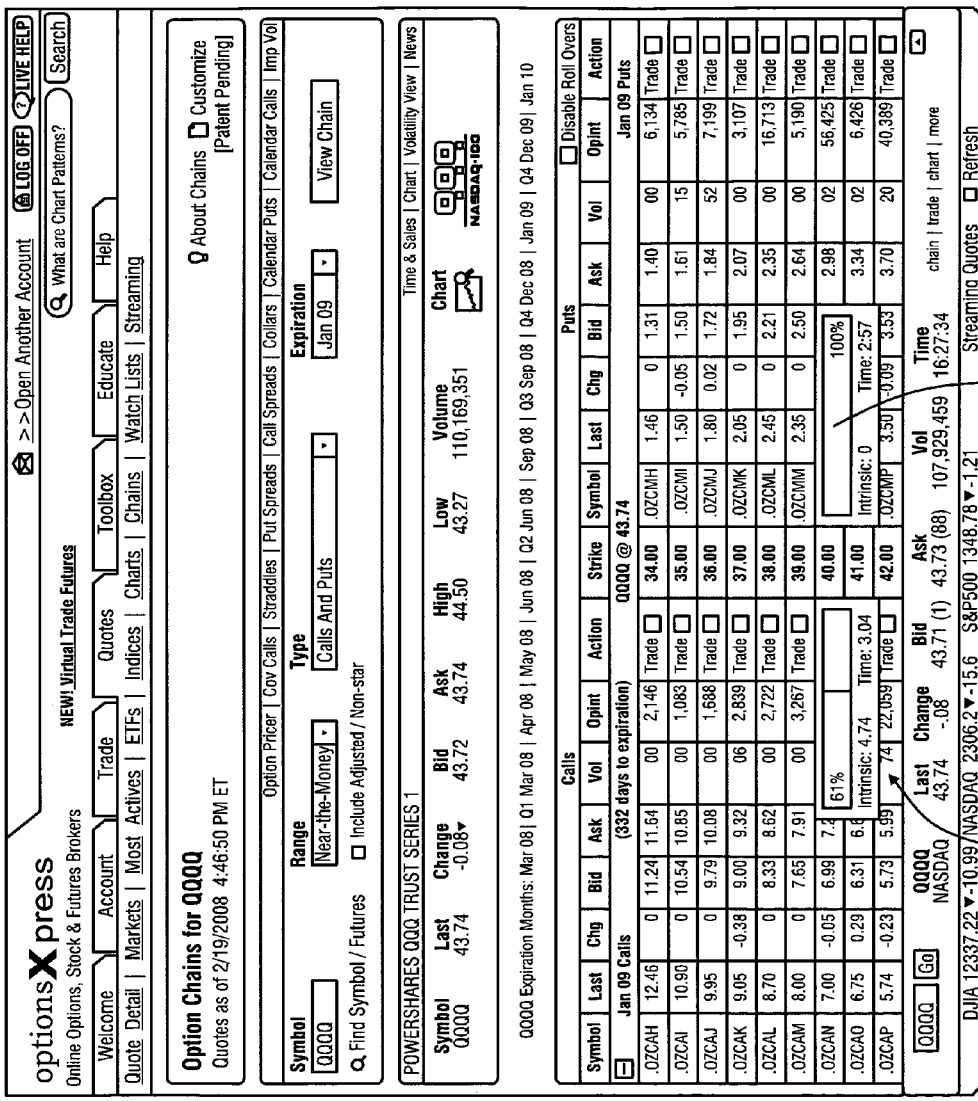
FIG. 4 is an option chain trading screen illustrating an intrinsic value and time value "roll over" feature according to the present invention.

FIG. 4 is an option chain trading screen 54 illustrating another "roll over" feature 500 of value box 540 for a specific option by rolling over the strike price 424 (see FIG. 1). The investor views the value box 540 as an illustration of the percentage of an option price that is intrinsic or time value.

FIG. 5 is an option chain trading screen 55 illustrating another hover over feature 500 for an information area 550. The information area 550 acts essentially as a quote box, but with more detailed information. Each option includes an information symbol 551. The investor "rolls over" the information symbol 551 next to the option to view the information area 550. The information area 550 includes detailed information regarding that particular option, such as last trade, change, open, volume, bid, bid size, ask, ask size, expiration, and open interest.

FIG. 6A and FIG. 6B illustrate another hover over feature 500. FIG. 6A is an option chain trading screen 56 with a spread for price improvement embedded. A spread is a limited risk, limited reward strategy established by combining options that would, if separate, profit from opposite moves in the price of the security. With a price improvement embedded, if a better price exists for the given chain, the price of the ask or bid is highlighted by a border element 552 as shown in FIG. 6A. As the investor hovers over the border element 552, a price improvement box 560 results as shown in FIG. 6B. FIG. 6B is an option chain trading screen 57 illustrating another hover over feature 500 of a price improvement box 560 that shows the available price improvement.

Figure 8:
FIG. 8 is an option chain trading screen illustrating a multi-leg strategy of a vertical spread according to the present invention.

FIG. 7, FIG. 8, and FIG. 9 illustrate multi-leg strategies 600 using a triple-action selection feature. Each option symbol has a corresponding checkbox 450. According to the present invention, a triple-action selection feature allows an investor to select one of three states in a checkbox 450—buy, sell, neither—wherein each state is denoted by a click. For example, a first click within a checkbox 450 for a option denotes a buy state, a second click within a checkbox 450 for an option denotes a sell state, and a third click within a checkbox 450 for an option denotes a reset state such that the checkbox returns to its original unselected state. It is also contemplated that a reset button may allow all checkboxes to return to an original or unselected state.

FIG. 7 is an option chain trading screen 60 illustrating a multi-leg strategy 600 of a horizontal spread 610. A horizontal spread is also known as a time or calendar spread. This spread is established by selecting options via checkboxes with different expirations but the same strike price. As shown, the investor selected a checkbox for a "buy" (one click) and a checkbox for a "sell" (two clicks) for the same strike price of 52.0, but for different expiration of April 2008 for the "buy" and May 2008 for the "sell".

FIG. 8 is an option chain trading screen 61 illustrating a multi-leg strategy 600 of a vertical spread 620. A vertical spread is selecting options via checkboxes that have the same expiration but different strike prices. As shown in FIG. 8, the investor selected a checkbox for a "buy" (one click) and a checkbox for a "sell" (two clicks) for the same expiration of March 2008 but different strike prices—41.00 for the "buy" and 42.00 for the "sell".

A diagonal spread is selecting options via checkboxes with different strike prices and different expirations. FIG. 9 is an option chain trading screen 62 illustrating a multi-leg strategy 600 of a diagonal spread 630. As shown, the investor selected a checkbox for a "buy" (one click) and a checkbox for a "sell" (two clicks) with different expiration dates and different strike prices. The "buy" option has an expiration of March 2008 at a strike price of 41.00 and the "sell" option has an expiration of April 2008 at a strike price of 42.00.

Another advantage of the present invention is manageability of option trades from a single screen, such as to determining the merits of a trade or executing the trade, through the use of trade manage buttons 700. FIG. 10A is an option chain trading screen 70 illustrating trade manage buttons 700. Trade manage buttons 700 include a reset button 705, add to watch list button 710, mini pricer button 715, trade calculator button 720 and trade button 725. After an investor selects an option to buy or sell via the checkbox 450 according to the triple-action selection feature described above, the investor can reset the checkboxes 450 to an unselected state by selecting reset button 705.

Figure 10B:
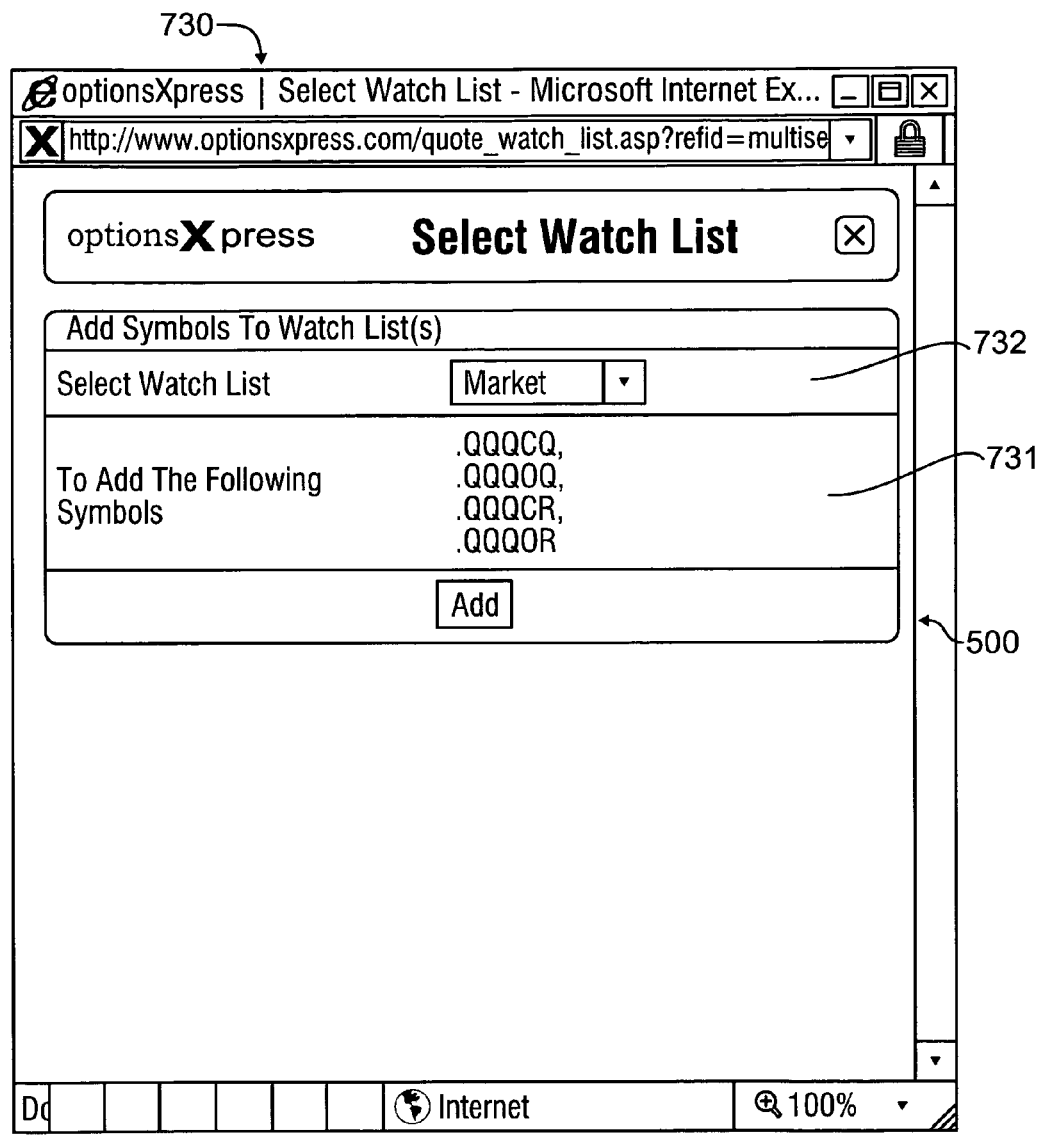
FIG. 10B is an option chain trading screen illustrating a watch list "roll over" feature according to the present invention.

The investor can add certain options to a watch list. As shown in FIG. 10A, the investor selects the options to buy or sell via the corresponding checkbox 450. Upon the investor selecting the add to watch list button 710, an option chain trading screen 71 illustrating a "roll over" feature 500 of a watch list 730 is illustrated as shown in FIG. 10B. The watch list 730 includes the type of watch list 732 and the option symbols 731 to add to the selected type of watch list 732. The option symbols 731 correspond to the selections of FIG. 10A.

Figure 11B:
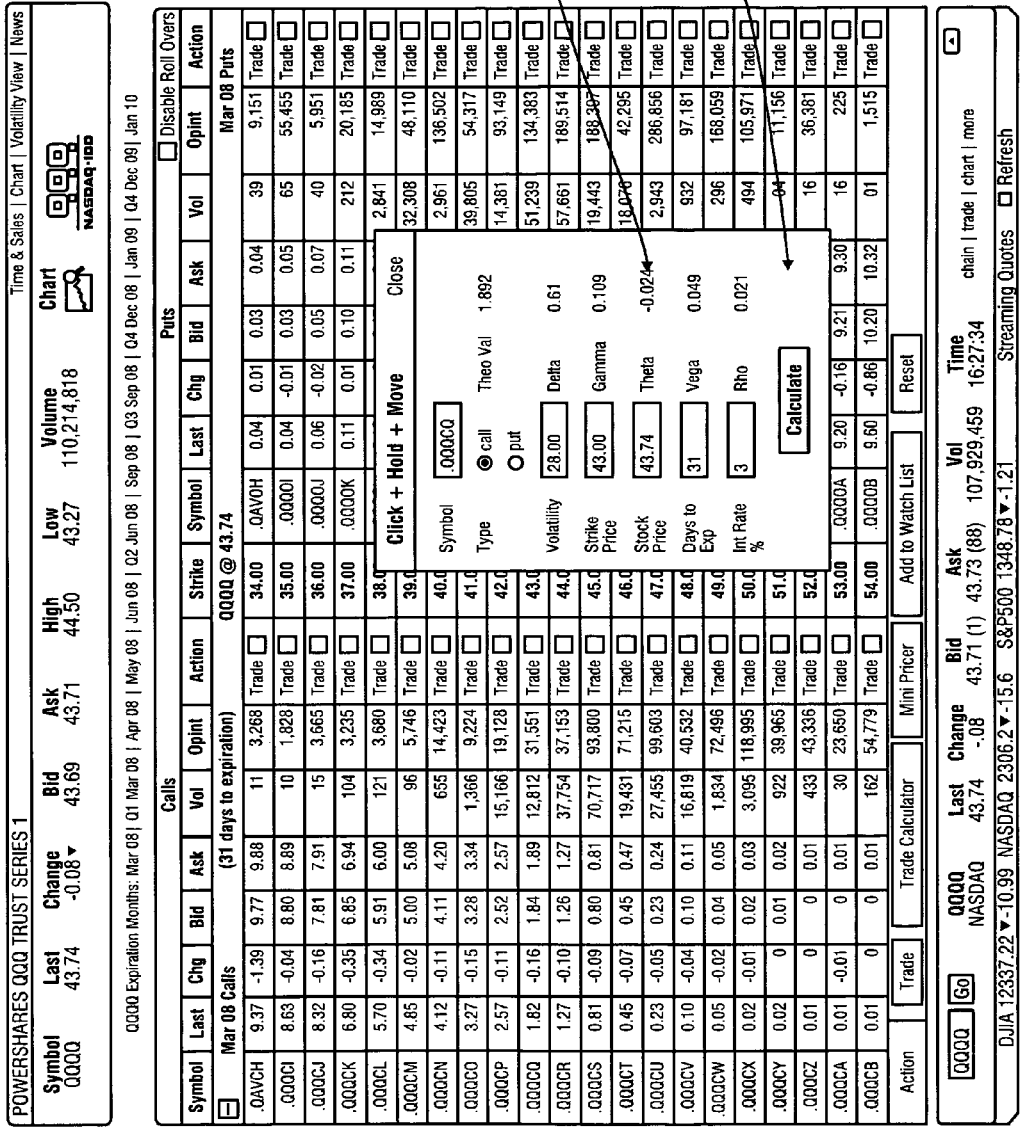
FIG. 11B is an option chain trading screen illustrating a pricing ticket "roll over" feature according to the present invention.

FIG. 11A is an option chain trading screen 72 illustrating trade manage buttons 700. Upon the investor selecting an option via the corresponding checkbox 450, the investor can select the mini pricer button 715 to analyze the theoretical value of the option. FIG. 11B is an option chain trading screen 73 illustrating a "roll over" feature 500 of a mini pricing ticket 740. The mini pricing ticket 740 analyzes the theoretical value of the option according to volatility, strike price, stock price, days to expiration, interest rate and Greeks.

Figure 12A:
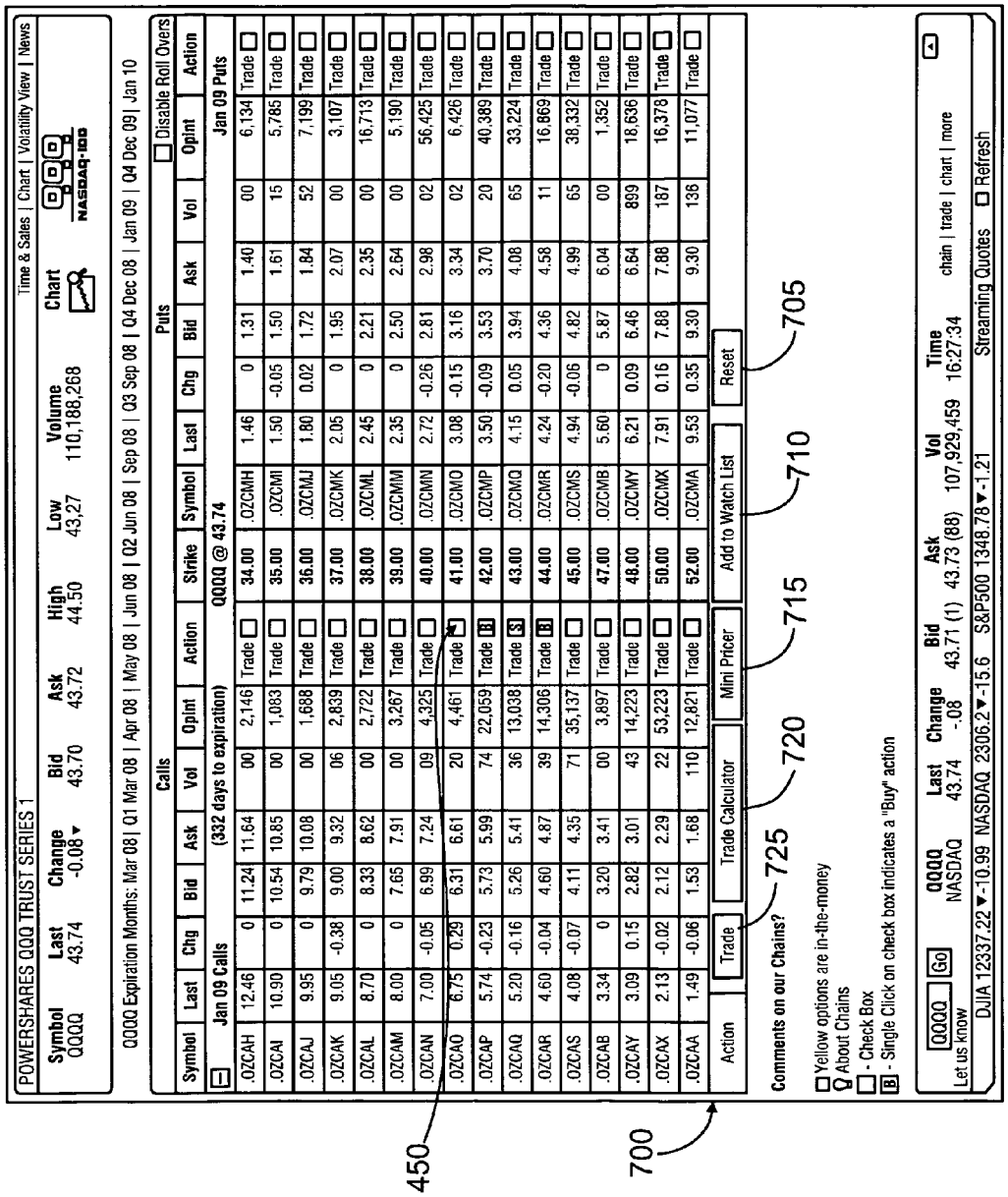
FIG. 12A is an option chain trading screen illustrating trade manage buttons according to the present invention.
Figure 12B:
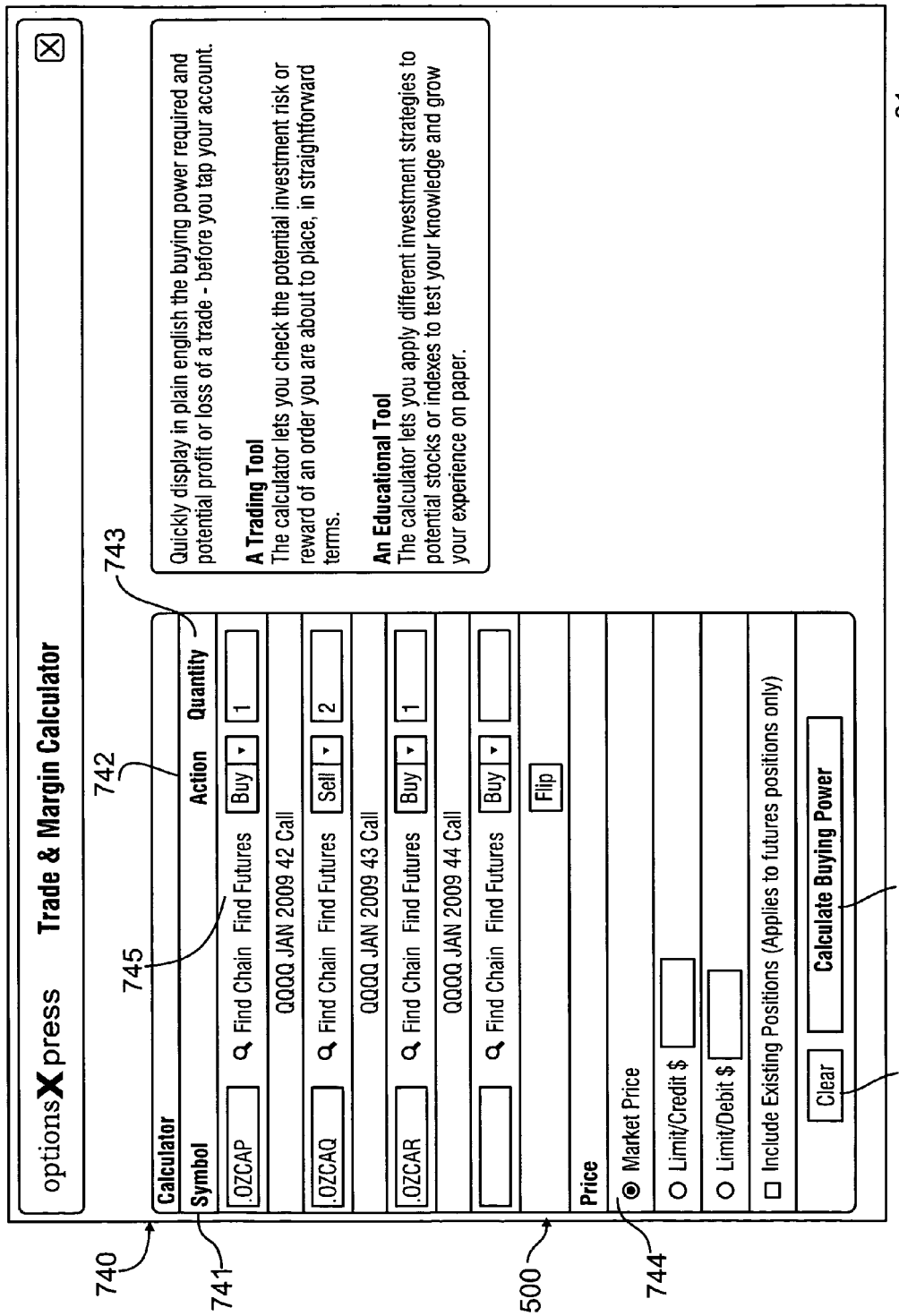
FIG. 12B is an option chain trading screen illustrating a trade calculator "roll over" feature according to the present invention.

FIG. 12A is an option chain trading screen 80 illustrating trade manage buttons 700. Upon the investor selecting an option via the corresponding checkbox 450, the investor can select the trade calculator button 720 to analyze the trade. The trade calculator quickly displays the buying power required and the potential profit or loss of the trade, before the customer's account is accessed. The trade calculator allows the customer to check the potential investment risk or reward of an order before it is placed. It also allows the customer to apply different investment strategies. If the investor selects the trade calculator button 720, the investor is directed to trading screen 81 as shown in FIG. 12B, although it is contemplated the trade calculator can be a "roll over" feature 500. The trade calculator 740 evaluates the buying power, or potential investment risk or reward of the trade before the investor executes the trade. Components of the trade calculator 740 include option symbol 741, action 742, quantity 743 and price 744. The investor can apply different investment strategies by varying any of these components. The trade calculator 740 also has a find feature 745 to allow an investor to find a chain or futures based on the selected option symbol 741.

After the investor enters the components 741, 742, 743, 744 of the trade calculator 740, the investor can clear all the selections via the clear button 748 or view the result of the spread by selecting the calculate buying power button 749.

Figure 12C:
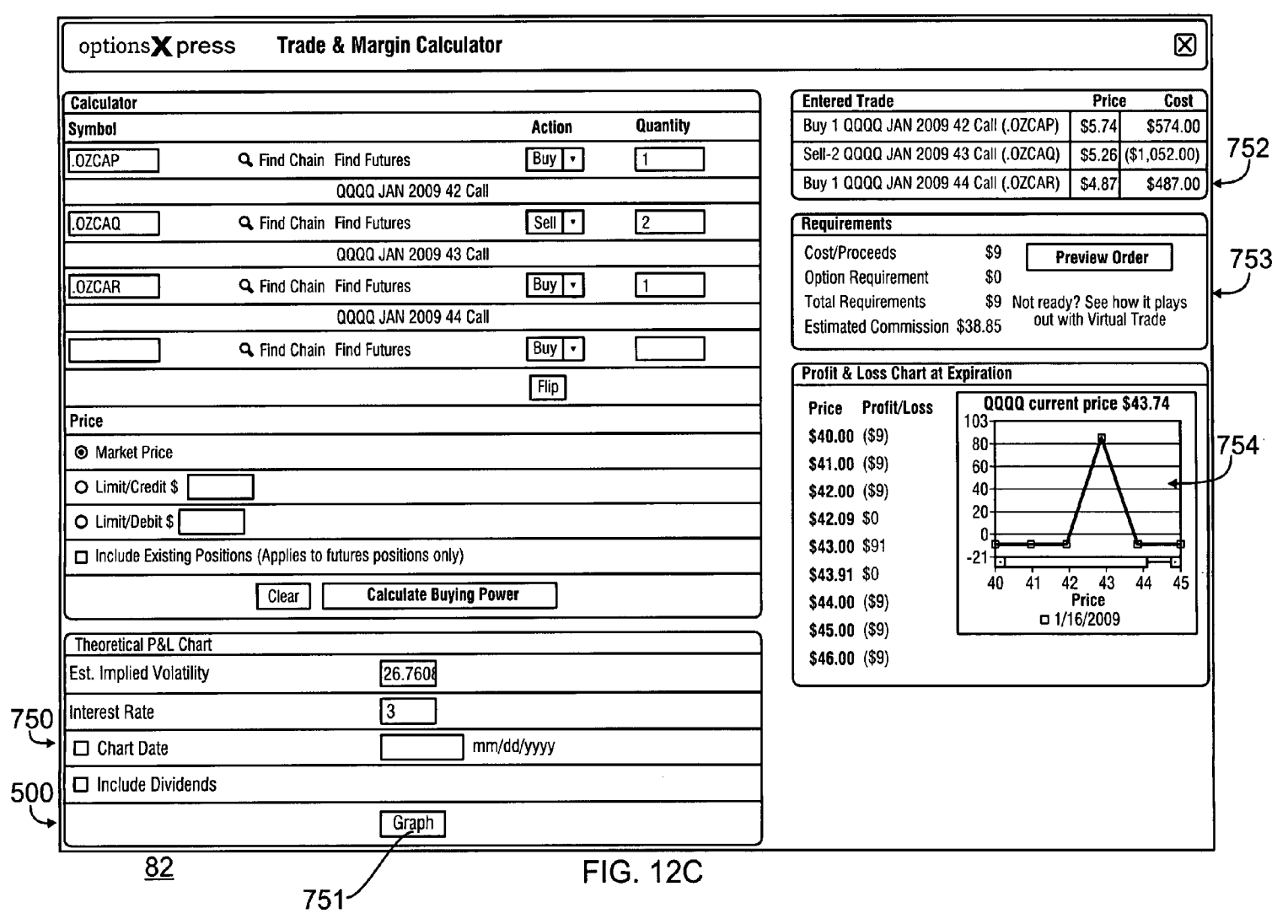

FIG. 12C is an option chain trading screen 82 illustrating a "roll over" feature 500 of the theoretical buying power box 750. The theoretical buying power box 750 includes values of estimated implied volatility, interest rate, chart date and dividends. These values can be illustrated in a graphical format by selecting the graph button 751. Selecting the graph button 751 produces information of the entered trade 7522, requirements for the trade 753, and profit and loss chart 754. The entered trade 752 summarizes the information entered from the trade calculator 740. The requirements for the trade 753 breaks down the entire loss or profit the investor would realize if the trade was executed. The profit and loss chart 754 graphically illustrates the theoretical buying power.

Figure 12D:
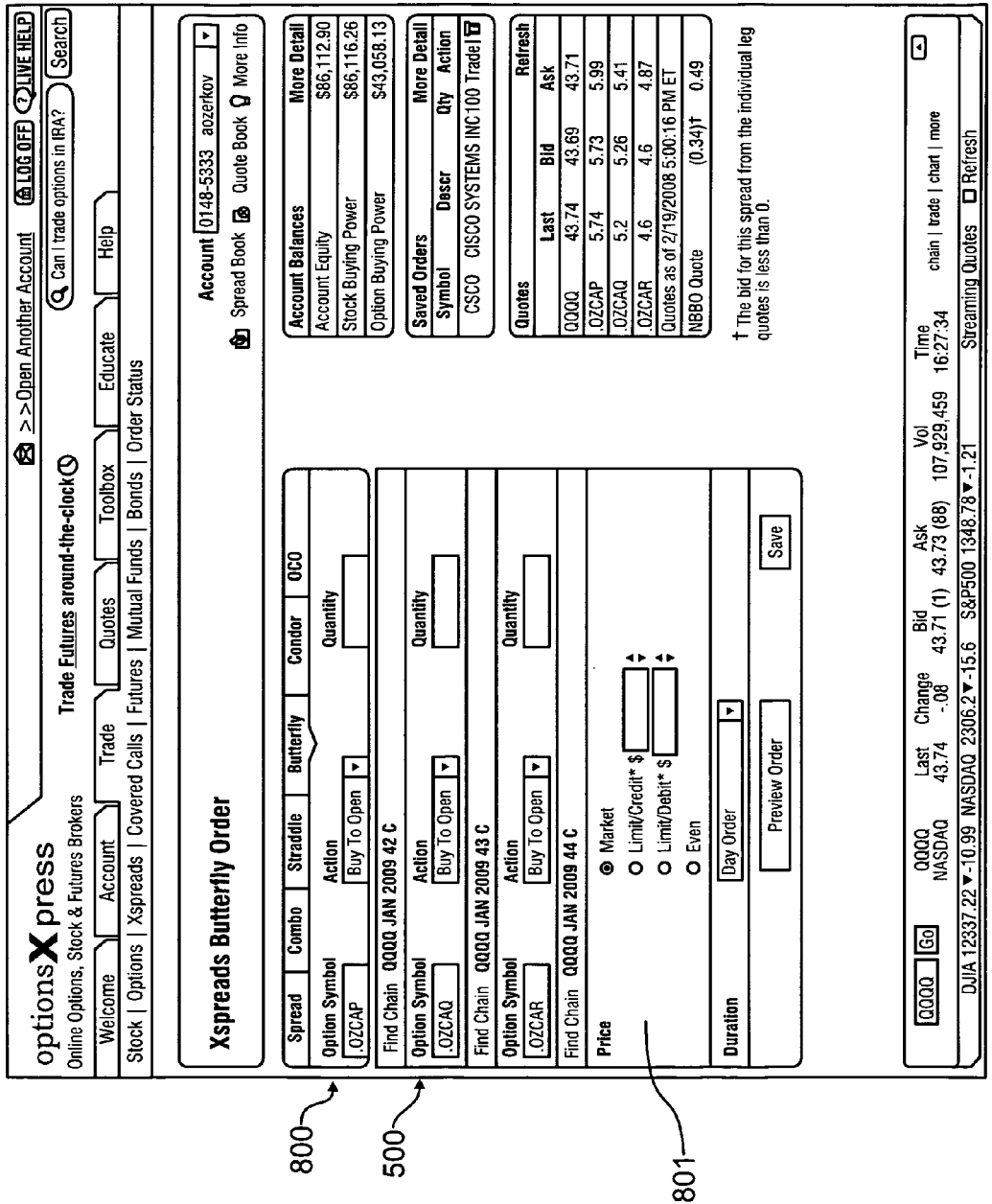
FIG. 12D is an option chain trading screen illustrating a butterfly trade ticket according to the present invention.

Turning back to FIG. 12A, if the trade button 725 is selected, a trade ticket 800 results as shown in FIG. 12D. It is further contemplated that the trade ticket 800 can be a "hover" feature 500. FIG. 12D is an option chain trading screen 83 illustrating the trade ticket 800. Smart logic is an algorithm that determines the appropriate trade ticket according to the options the investor selected and directs the investor to the appropriate trade ticket discussed more fully in reference to FIG. 14A and FIG. 14B. Smart logic determines whether the trade is a single leg trade, butterfly, condor, straddle, spread or multi-trade and provides the appropriate trade ticket. As shown in FIG. 12D, butterfly ticket 801 summarizes the options selected via checkboxes 450 in FIG. 12A. Here a butterfly ticket 801 is used since the order involves three call options each at a different strike price, more specifically a sell call option at a strike price in between the strike prices of two buy call options.

Figure 13B:
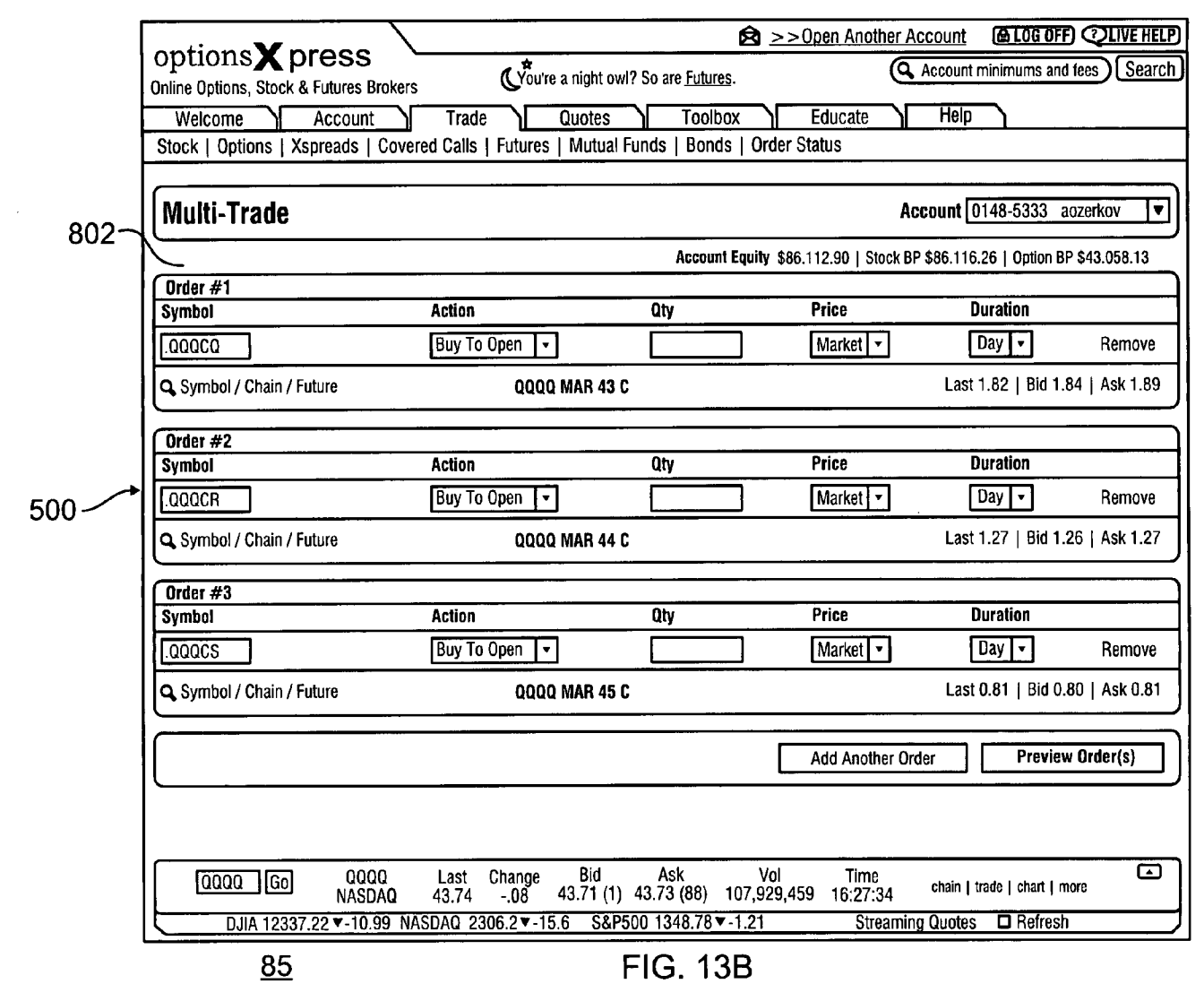

FIG. 13A is an option chain trading screen 84 illustrating trade manage buttons 700. If the trade button 725 is selected, a trade ticket results as shown in FIG. 13B.

FIG. 13B is an option chain trading screen 85 illustrating the trade ticket 800. It is also contemplated that the trade ticket 800 can be a "hover" feature 500. Again, smart logic of the present invention determines the appropriate ticket according to the options the investor selected and directs the investor to the appropriate trade ticket. As shown in FIG. 13B, multi-trade ticket 802 summarizes the options selected via checkboxes 450 in FIG. 13A. Here a multi-trade ticket 802 is used since the order involves three buy call options each at a different strike prices, more specifically a sell call option at a strike price in between the strike prices of two buy call options.

Figure 14A:
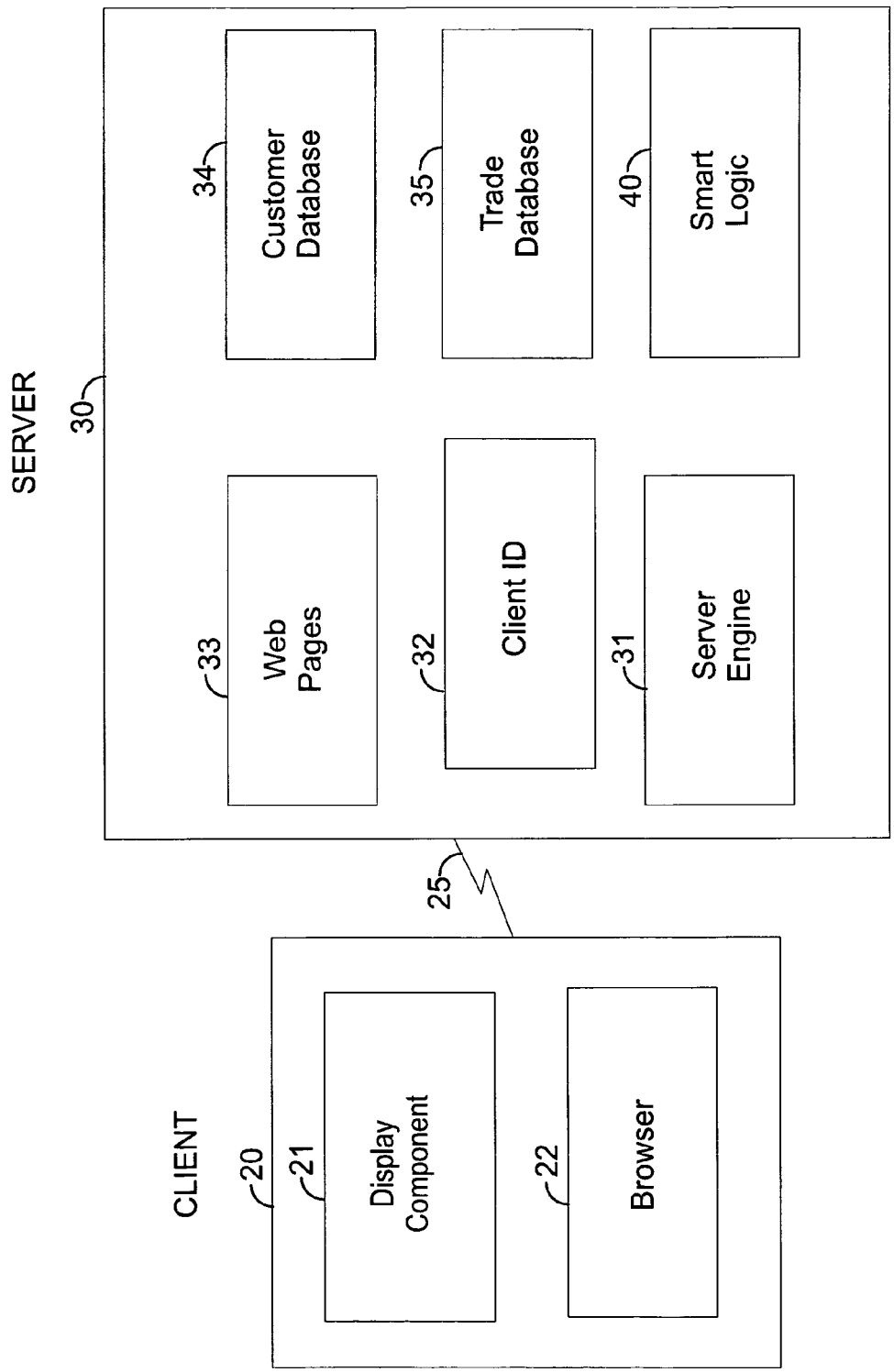
FIG. 14A is a system block diagram according to the present invention.

FIG. 14A is a block diagram illustrating an embodiment of the present invention. This embodiment supports the present invention over the Internet using the World Wide Web. The server system 30 includes a server engine 31, a client identifier 32, Web pages 33, a customer database 34, a trade database 35 and a smart logic algorithm 40. The server engine 31 receives requests to access Web pages 33 identified by URLs and provides the Web pages 33 to the various client systems 20. Such a request may indicate that the customer has performed the triple-action selection to effect trading. The customer database 34 contains customer information such as the name of the customer and billing information. The trade database 35 contains a description of the various securities or items that may be traded as well as those trades that have been fulfilled or executed. The server 30 implements a smart logic algorithm 40 that registers the selections made by the customer and associates the selections to a trade ticket. The smart logic algorithm then populates the trade ticket in order to execute the trade.

The client identifier 32 is an identifier that uniquely identifies a client system 20. The client system 20 includes a display component 21 and also contains a browser 22. A display component 21 is a device conveying visual information, and may further include tactile presentation of images (including text). While most common displays are designed to present information dynamically in a visual medium, tactile displays, usually intended for the blind or visually impaired, use mechanical parts to dynamically update a tactile image (usually of text) so that the image may be felt by the fingers. Examples of display devices include a television, monitor, plasma display, rear projector, or a screen on the portable device.

In one embodiment, the server system 30 assigns and sends the client identifier 32 to the client system 20 upon interaction between the client system 20 and the server system 30. The server system 30 and client system 20 interact by exchanging data via communications link 25, which may include transmission over the Internet. Data includes, for example, the fulfillment and execution of the trade.

Figure 14B:
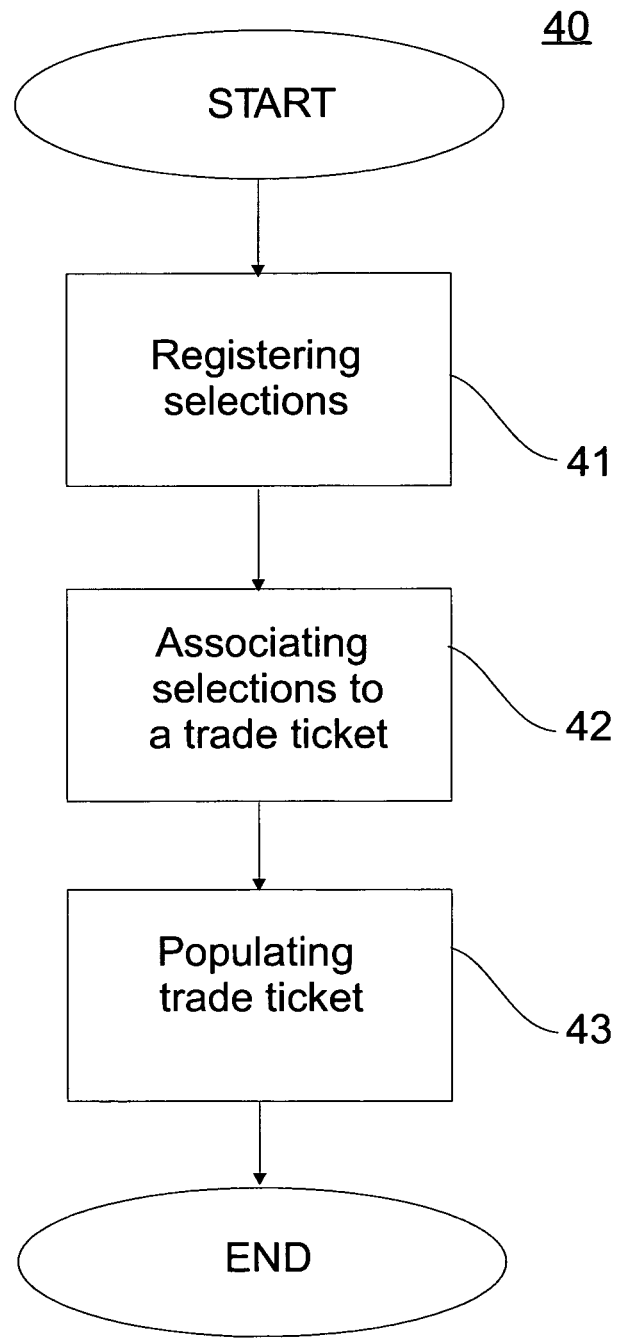
FIG. 14B is a flow chart of the smart logic algorithm according to the present invention.

FIG. 14B is a flow chart of the smart logic algorithm 40 according to the present invention. According to the present invention, the server 30 implements a smart logic algorithm 40. The smart logic algorithm 40 registers the selections made by the customer at step 41, for example selections made to checkboxes using triple-action selection. After registering the selections as step 41, the algorithm 40 associates the selection to the appropriate trade ticket (single leg trade, butterfly, condor, straddle, spread or multi-trade) at step 42. At step 43, the trade ticket is populated with the trade selections in order to execute the trade.

One skilled in the art would appreciate that the present invention can be used in various environments other than the Internet. Also, various communication channels may be used such as local area network, wide area network, or point-to-point dial up connection. Also, a server system may comprise any combination of hardware or software that can execute a smart logic algorithm and generate trades. A client system may comprise any combination of hardware or software that can interact with the server system.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer-implemented method for facilitating trading in one or more items by a customer, said method comprising the steps of:

providing a computer trading screen with a plurality of icons representing information linked to the one or more items, a plurality of trade checkboxes and a plurality of supplemental information that can be accessed by the customer by hovering a screen indictor at one or more of the icons;

offering said supplemental information as said screen indictor hovers at the one or more of the icons;

receiving a click selection input from a checkbox using a triple-action selection to denote one of three states within the checkbox in order to formulate a trade, wherein a first click selection input within the checkbox denotes a buy state of the trade, a second click selection input within the checkbox denotes a sell state of the trade, and a third click selection input within the checkbox denotes a unselected state of the trade with the unselected state being neither the buy state nor the sell state;

determining by a computer based on the click selection input whether the trade is a single leg trade, butterfly, condo, straddle spread or multi-trade and associating the trade to a trade ticket; and executing the trade via the trade ticket.

2. The method of claim 1, wherein said offering step further comprises the step of displaying a chart.

3. The method of claim 1, wherein the one or more items is a security option.

4. The method of claim 3, wherein said offering step further comprises the step of displaying a quote book.

5. The method of claim 3, wherein said offering step further comprises the step of displaying a quote box.

6. The method of claim 3, wherein said offering step further comprises the step of displaying a trade calculator.

7. The method of claim 3, wherein said offering step further comprises the step of displaying a Greeks book.

8. The method of claim 3, wherein said offering step further comprises the step of displaying a price improvement box.

9. The method of claim 3, wherein said offering step further comprises the step of displaying a watch list.

10. The method of claim 3, wherein said offering step further comprises the step of displaying a pricing ticket.

11. The method of claim 3, wherein said offering step further comprises the step of displaying an estimated buying result.

12. A system for trading one or more items, by a customer, comprising:

a client computer, said client computer including a display component for displaying a plurality of icons representing information including a plurality of checkboxes and supplemental information that can be accessed by a screen indicator hovering at the one or more icons; and a server, said server receiving data via a communications link from said client computer, wherein the data includes a trade ticket corresponding with a triple-action selection denoting one of three states of a trade within the one or more of the plurality of checkboxes, a first action of the triple-action selection within the one or more of the plurality of checkboxes denoting a letter "B" for a buy state of the trade, a second action of the triple-action selection within the one or more of the plurality of checkboxes denoting a letter "S" for a sell state of the trade, and a third action of the triple-action selection within the one or more of the plurality of checkboxes denoting no letter for a unselected state of the trade which is neither the buy state of the trade nor the sell state of the trade, wherein the server determines whether a trade is a single leg trade, butterfly, condo, straddle spread or multi-trade and associates the trade with the trade ticket, and further said server fulfills the trade ticket and executes the trade of the one or more items.

13. The system for trading one or more items according to claim 12, wherein said server fulfills the trade ticket of a single leg trade, butterfly, condo, straddle spread or multi-trade by registering the triple-action selection, associating the triple-action selection to the trade ticket, and populating the trade ticket according to the triple-action selection of the plurality of checkboxes.

14. The method of claim 1, wherein the first click selection input within the checkbox denotes a letter "B" for the buy state of the trade, the second click selection input within the checkbox denotes a letter "S" for the sell state of the trade, and a third click selection input within the checkbox denotes no letter in the unselected state of the trade.

* * * * *